United States Patent [19]
Shiro

[11] Patent Number: 6,122,312
[45] Date of Patent: Sep. 19, 2000

[54] ACOUSTIC WAVE COMMUNICATION APPARATUS AND METHOD

[75] Inventor: Shirai Shiro, Seoul, Rep. of Korea

[73] Assignee: SI Corporation, Seoul, Rep. of Korea

[21] Appl. No.: 09/443,499

[22] Filed: Nov. 19, 1999

Related U.S. Application Data

[62] Division of application No. 08/684,210, Jul. 19, 1996, Pat. No. 6,011,819.

[30] Foreign Application Priority Data

| Jul. 19, 1995 | [KR] | Rep. of Korea | 95-21220 |
| Nov. 30, 1995 | [KR] | Rep. of Korea | 95-45697 |
| Jun. 29, 1996 | [KR] | Rep. of Korea | 96-26404 |

[51] Int. Cl.$^7$ ............................. H04K 1/00; H03D 1/04
[52] U.S. Cl. ......................... 375/147; 375/346; 367/135
[58] Field of Search ................................. 375/285, 316, 375/346, 348, 151, 147; 367/131, 137, 135

[56] References Cited

U.S. PATENT DOCUMENTS

| 3,737,857 | 6/1973 | Carman | 367/133 |
| 5,559,828 | 9/1996 | Armstrong et al. | 375/147 |
| 5,581,516 | 12/1996 | Blackmon | 367/137 |
| 6,011,819 | 1/2000 | Shiro | 367/135 |

*Primary Examiner*—Tespaldet Bocure
*Attorney, Agent, or Firm*—Sughrue, Mion, Zinn, Macpeak & Seas, PLLC

[57] ABSTRACT

An apparatus for accurately transmitting and receiving acoustic waves indoors is provided. The apparatus contains a microphone, a speaker, a processing circuit, a first amplifier, a second amplifier, and a power control circuit. The microphone converts an input acoustic wave into an electric signal, and the speaker generates an output acoustic wave based on input data. The processing circuit processes the electric signal to produce processed data and outputs the input data to drive the speaker. The first amplifier receives a power signal and detects if a starting signal is contained in the electric signal output from the speaker. Then, the amplifier outputs a first detection signal when the starting signal is detected and outputs the power signal when the first detection signal is output. The second amplifier receives the power signal from the first amplifier and detects if a non-starting signal is contained in the electric signal when the starting signal is detected. The amplifier outputs a second detection signal when the non-starting signal is detected. The power control circuit supplies the power signal to the processing circuit when the first and second detection signals have a predetermined relationship. Furthermore, methods for accurately detecting data contained in the input acoustic wave are also provided.

18 Claims, 12 Drawing Sheets

101, 107 fs    RDD

102

P0

103

P2

109

110

P1

115

111

FIG. 2H
101, 107
FIG. 2I
102
FIG. 2J
103  PO
FIG. 2K
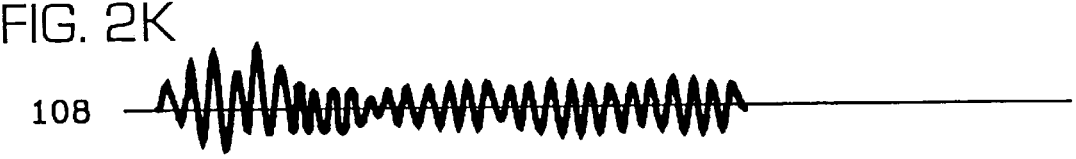
108
FIG. 2L  P2
109
FIG. 2M
110

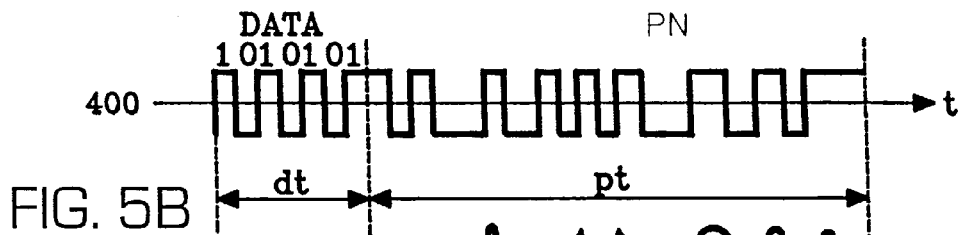
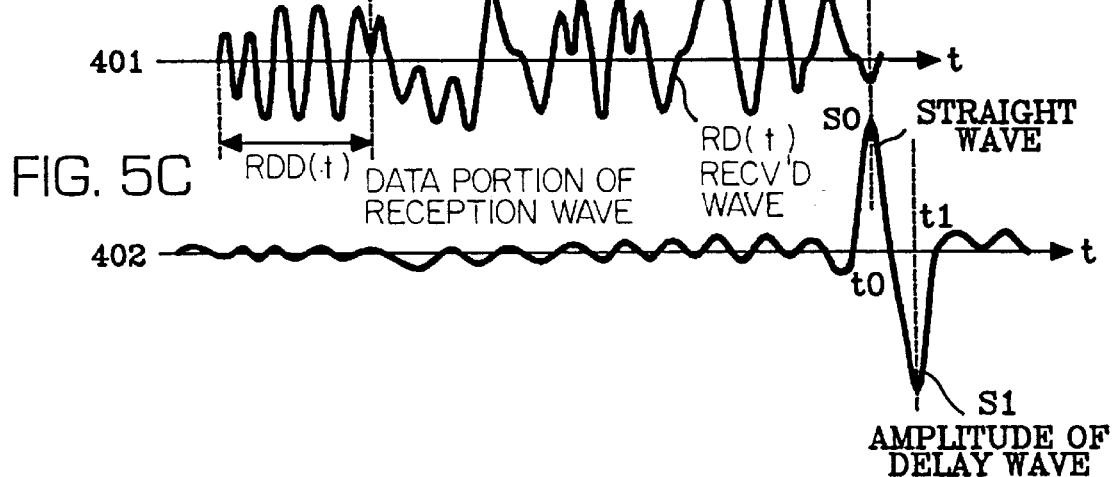
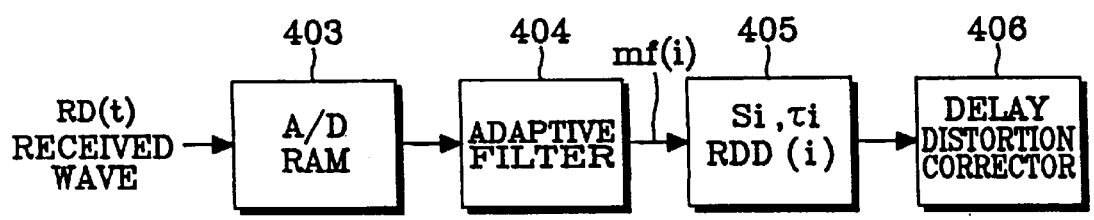

0 0 0 1 1 0 1 1
FIG. 13A  di(t)  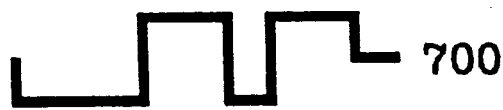 700
FIG. 13B  N0(t)   701
FIG. 13C  N1(t)   702
FIG. 13D  N2(t)   703
FIG. 13E  N3(t)   704
FIG. 13F  N4(t)  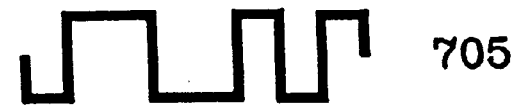 705

ACOUSTIC WAVE COMMUNICATION APPARATUS AND METHOD

RELATED APPLICATION

This application is a Divisional application of Ser. No. 08/684,210, now issued as U.S. Pat. No. 6,011,819 on Jan. 4, 2000.

The present application is based on Korean Application No. 21220/1995 which is incorporated herein by reference for all purposes.

FIELD OF THE INVENTION

The present invention relates to an indoor radio communication system. More particularly, the present invention relates to a communication apparatus and method for transmitting and/or receiving data indoors via acoustic waves. Such a communication apparatus or method may be incorporated into a crime/disaster prevention system (e.g. a burglar alarm and/or a fire alarm).

BACKGROUND OF THE INVENTION

Crime/disaster prevention systems (e.g. alarm systems) are generally made from wireless communication systems because the construction and installation of wireless systems is relatively simple. For example, many alarm systems comprise a sensor and a receiving unit. The sensor may be located near a window or an entrance to detect the presence of an intruder or fire. The receiving unit may monitor the status of the sensor and may transmit information to a remote control center if the sensor detects an intruder or fire. Moreover, in order to facilitate the installation of the receiving unit and the sensor, such devices may not be connected via wires but may communicate via the transmission and reception of radio waves.

However, several restrictions are placed on the operation of such a wireless alarm system. In particular, many of the limitations arise due to the legal restrictions which prevent the use of radio waves having particular frequency and output ranges. Accordingly, the many alarm systems cannot communicate via the types of radio waves which are best suited for communicating indoors.

For instance, some alarm systems are forced to communicate via weak radio waves having frequencies of several hundred megahertz. In an open area, such weak radio waves enable smooth and clear communication between a receiver and a transmitter which are located several tens of meters apart from each other. However, when the receiver and transmitter are located within an indoor room, the weak radio wave collides with and reflects off of various structures within the room (e.g. walls, ceiling, floor, furniture, etc.). Consequently, the radio wave dissipates as it is travelling to the receiver as a result of such reflections and collisions, and the intensity of the wave sharply decreases. The phenomenon above is typically called fading.

A radio wave having a frequency of several hundred megahertz has a wavelength on the order of one meter. Therefore, since the dimensions of indoor rooms are on the order of several meters, fading occurs at many places inside indoor rooms. If the orientation of the objects within an indoor room changes (e.g. furniture is rearranged or people walk through the room), the locations in the room where the fading of a radio wave occurs likewise varies. Furthermore, the communication between a sensor and a reception unit may often fail when the orientation of objects within the room only changes slightly, even though communication could be maintained up until such slight change.

In addition, the communication between a sensor and a reception unit is also adversely effected by noise produced from electric appliances such as televisions and refrigerators. Thus, the distance over which the sensor and reception unit can properly communicate becomes very short, and often, the sensor cannot appropriately inform the reception unit that it has detected an intruder or a fire. Accordingly, the alarm system may have to be redesigned so that the sensor is relocated in the room such that it can adequately communicate with the reception unit. Alternatively, a wire may have to be used to provide a communication path between the sensor and the reception unit, but such solution contradicts the entire purpose of a wireless system.

In order to ensure that the alarm system is operating properly, the reception unit must periodically communicate with the sensor to determine the status of the sensor and confirm that it is functioning correctly. Consequently, the sensor may supply relevant information to the reception unit in one of two manners. First, the reception unit and the sensor may be designed to communicate in a bidirectional mode. In such mode, each of the reception unit and the sensor comprises a transmitter and receiver. Therefore, when the reception unit needs information, it transmits an information request signal to the sensor, and the sensor transmits the requested information to the reception unit in response to such signal. Also, the two devices may be designed to communicate in a fixed-time alarming mode. In this mode, the sensor comprises a transmitter, and reception unit comprises a receiver. Thus, the sensor periodically outputs a signal corresponding to its status without the reception unit previously requesting such information.

An alarm system which has a reception unit and a sensor which communicate via the bidirectional mode is very reliable and versatile. For instance, if a person who is in the room is authorized to be in the room, the reception unit can be programmed in accordance with such fact. Thus, the reception unit can send a command to disable the sensor so that the sensor does not erroneously determine that the authorized person is an intruder. Furthermore, if the sensor is disabled, the reception unit can still transmit a command to the sensor to determine if the sensor is still operating properly. In response to such command, the sensor transmits a status command back to the reception unit.

However, a system which uses the bidirectional communication mode has some disadvantages. For example, since an alarm system typically contains a plurality of sensors, installing a receiver in each sensor is relatively expensive. Furthermore, in order to receive a radio signal having a wavelength of about one meter, each sensor must comprise an antenna having a length of approximately 20 to 40 cm, and thus, the size of the sensor is significantly increased. Using a large sensor in an alarm system defeats the purpose of the alarm system because the sensors ideally should be concealed from potential intruders. In addition, using a large antenna for each sensor detracts from the aesthetics of the room.

The fixed-time alarming mode is advantageous because the sensor only contains a transmitter, and the reception unit only contains a receiver. Moreover, the transmitter located in the sensor is simpler than the receiver located in the sensor described above. Therefore, the antenna needed to transmit radio waves from the sensor can be a print pattern which is only several centimeters long. In addition, the power consumed by a transmitter is much smaller than the power consumed by a receiver. Accordingly, the sensor can easily operate by using a battery as a power supply. As a result of the advantages above, alarm systems using the fixed-time alarming mode are more widely distributed than systems using the bidirectional communication mode.

However, an alarm system using the fixed-time alarming mode has several disadvantages. For example, the sensor typically transmits its status to the reception unit less than once every ten minutes. Moreover, since communicating via weak radio signals is not extremely reliable, the reception unit waits until it has not received a status signal from the sensor on multiple instances before determining that the sensor has malfunctioned. However, such procedure lengthens the time needed for the reception unit to detect that the sensor has malfunctioned.

In addition, the reception unit is typically connected to a remote control center and has a dialing device which automatically calls the control center if the sensor has detected a problem. However, if a fire or intruder is present in the room and disables the sensor before the sensor can detect such presence, the reception unit waits to receive a status signal from the sensor at multiple instances before calling the control center to inform the center that the sensor has malfunctioned (or has been disabled). Since the sensor may transmit a status signal to the reception unit only once every ten minutes, the reception unit may wait 30 or 40 minutes (i.e. attempting to receive the status signal three or four times) before contacting the control center. As a result, the control center is unable to contact the proper authorities to quickly respond to the fire or intrusion. (Furthermore, since an alarm system using the bidirectional communication mode may also wait before contacting the control center, such system also suffers from the disadvantage above).

In order to overcome the disadvantages of wireless alarm systems which communicate via radio waves, an alarm system comprising a sensor which communicates in the fixed-alarm mode by transmitting ultrawaves having a frequency of 25 KHz has been proposed. In such system, the sensor comprises a transmitter having a speaker that is made of a ceramic device 10 mm in diameter. Alternatively, the reception unit may comprise a receiver made of such ceramic device.

In addition, the alarm system employs a simple modulation process in which a "1" and a "0" are represented by the presence or absence of the ultrawave transmission. Therefore, the configuration of such system is simplified, and its cost is reduced. Furthermore, ultrawave transmissions are much less effected by interference than radio wave transmissions.

However, the communication speed of an alarm system using ultrawaves is very slow. Specifically, in order to avoid a data error caused by interference between two sequential signals, a new signal cannot be transmitted until the reverberation of the ultrawave corresponding to the preceding signal disappears. Consequently, the above alarm system takes several minutes to confirm the status of all of the sensors of the system, and thus, the system may not be able to quickly respond to an emergency. Furthermore, if an object is placed in the communication path between the sensor and the reception unit, a communication error will occur because the ultrawaves will be sharply attenuated. In light of the disadvantages above, few alarm systems communicate via ultrawaves.

Also, the alarm systems above use batteries for power supplies in order to reduce the amount of wiring needed to install the systems. Accordingly, such systems use various techniques to attempt to extend the life of the batteries. For example, battery life may be extended by controlling the duty cycle or by lengthening or shortening the period during which the battery supplies power to various parts of the system. However, if such period is lengthened (e.g. lengthened to about one second), the communication time between the sensor and reception unit is likewise lengthened. On the other hand, if such period is shortened (e.g. shortened to about several milliseconds), an expensive high precision transceiver is required because the operation of the system must be able to stabilize quickly.

SUMMARY OF THE INVENTION

An object of the present invention is to provide an acoustic communication apparatus and method in which bidirectional communication can be performed at a high speed with an acoustic wave which has a relatively low frequency and which is not affected by indoor obstacles.

Another object of the present invention is to provide an indoor acoustic communication apparatus and method in which highly reliable data communication can be performed by transmitting a minimum amount of acoustic waves despite the peculiar reverberation of the acoustic waves and despite the fact that substantial noise is produced from various devices.

Still another object of the present invention is to provide an acoustic communication apparatus and method which can be sustained for a long time by a voltage of a small battery and can be realized by a simple circuit configuration.

Yet another object of the present invention is to provide a wireless crime/disaster prevention system for activating a transceiver which transmits and/or receives acoustic waves in response to a starting signal transmitted via an acoustic wave in order to minimize the consumption of power.

In order to accomplish the above and other objects, an acoustic communication apparatus is provided. Specifically, the apparatus comprises: a microphone which converts an input acoustic wave into an electric signal; a speaker which generates an output acoustic wave based on input data; a signal processing circuit which processes said electric signal to produce processed data and which outputs said input data to drive said speaker; a starting signal selection amplifier which receives a power signal during a reception waiting mode and detects if a starting signal is contained in said electric signal output from said speaker, wherein said starting signal selection amplifier outputs a first detection signal when said starting signal is detected and outputs said power signal when said first detection signal is output; a non-starting signal selection amplifier which receives said power signal from said starting signal selection amplifier and detects if a non-starting signal is contained in said electric signal when said starting signal is detected by said starting signal selection amplifier, wherein said non-starting signal selection amplifier outputs a second detection signal when said non-starting signal is detected; and a power control circuit which supplies said power signal to said signal processing circuit when said first detection signal and said second detection signal have a predetermined relationship.

In the apparatus, said signal processing circuit comprises: a data amplifier which inputs said electric signal and selectively outputs a data portion of said electric signal, wherein said data portion does not contain said starting signal; and a microcomputer which extracts reception data from said data portion of said electric signal and which processes said reception data in order to produce said processed data.

Also, in the apparatus, said starting signal selection amplifier comprises: a first filter circuit which inputs said electric signal from said speaker and extracts said starting signal from said electric signal; a first detector which outputs said first detection signal based on said starting signal output from said first filter circuit; and a switch which inputs said power signal and selectively outputs said power signal to said non-starting signal selection amplifier based on said first detection signal.

Furthermore, in the apparatus, said non-starting signal selection amplifier comprises: a second filter circuit which inputs said electric signal from said speaker and extracts said non-starting signal from said electric signal; and a second detector which outputs said second detection signal based on said non-starting signal output from said second filter circuit, wherein said second detector outputs said second detection signal when said switch outputs said power signal to said non-starting signal selection amplifier.

In addition, in the apparatus, said power control circuit comprises: a comparator which inputs said first detection signal and said second detection signal and outputs a first power control signal based on said predetermined relationship between said first detection signal and said second detection signal; and a power control switch which selectively outputs said power signal to said signal processing circuit at least partially based on said first power control signal.

In order to further achieve the above and other objects, an acoustic wave communication method is provided. Specifically, the method comprises the steps of: (a) receiving a starting signal having a starting signal frequency which is included in a starting signal frequency band; (b) supplying a power-voltage to a signal processing circuit after said starting signal is received; (c) receiving a reception data signal; and (d) processing said reception data signal in said signal processing circuit after said power voltage is supplied to said signal processing circuit.

In order to additionally achieve the above and other objects, a data modulation/demodulation method for an acoustic communication apparatus which receives an acoustic reception wave having reception data and a pseudo-noise sign is provided. The acoustic reception wave corresponds to an acoustic transmission wave having transmission data and a transmission pseudo noise sign, and the method comprises the steps of: (a) receiving said acoustic reception wave; (b) converting said acoustic reception wave into a digital reception wave; (c) storing said digital reception wave as a stored reception wave; (d) dividing said stored reception wave into a data portion and a pseudo-noise sign portion based on said pseudo-noise sign; (e) determining at least one multipath delay characteristic value of said acoustic reception wave based on said pseudo-noise sign portion; (f) determining a transmission waveform based on said data portion, wherein said transmission waveform contains an initial data waveform which precedes an initial delay wave; (g) sequentially calculating delay waves relating to said transmission waveform based on said at least one multipath delay characteristic value; and (h) respectively subtracting said delay waves from said transmission waveform in order to compensate for a delay distortion contained in said data portion to produce a delay distortion corrected waveform.

BRIEF DESCRIPTION OF THE DRAWINGS

The above objects and advantages of the present invention will become more apparent by describing in detail preferred embodiments thereof with reference to the attached drawings in which:

FIG. 2H is a waveform of the output of the preamplifier 101 or 107 shown in FIG. 1 during a noisy environment;

FIG. 2I is a waveform of the output of the narrow band pass filter 102 shown in FIG. 1 during a noisy environment;

FIG. 2J is a waveform of the output of the detector 103 shown in FIG. 1 during a noisy environment;

FIG. 2K is a waveform of the output of the low pass filter 108 shown in FIG. 1 during a noisy environment;

FIG. 2L is a waveform of the output of the detector 109 shown in FIG. 1 during a noisy environment;

FIG. 2M is a waveform of the output of the comparator 110 shown in FIG. 1 during a noisy environment;

FIG. 5A illustrates a modulated data signal according to the present invention;

FIG. 5B illustrates a reception waveform which corresponds to the modulated data signal shown in FIG. 5A and which is output from the low pass filter 112 shown in FIG. 1;

FIG. 5C illustrates a waveform output from an adaptive filter contained in the microcomputer 113 shown in FIG. 1.;

FIG. 6 is a diagram of an illustrative embodiment of the internal structure and operation of the microcomputer 113 shown in FIG. 1;

FIG. 13A shows a waveform diagram of a transmission wave;

FIG. 13B shows a waveform diagram of a first noise waveform which is superposed on the transmission wave shown in FIG. 13A;

FIG. 13C shows a waveform diagram of a second noise waveform which is superposed on the transmission wave shown in FIG. 13A;

FIG. 13D shows a waveform diagram of a third noise waveform which is superposed on the transmission wave shown in FIG. 13A;

FIG. 13E shows a waveform diagram of a fourth noise waveform which is superposed on the transmission wave shown in FIG. 13A;

FIG. 13F shows a waveform diagram of a fifth noise waveform which is superposed on the transmission wave shown in FIG. 13A.

DETAILED DESCRIPTION OF THE PREFERRED EMBODIMENTS

Figure 1:
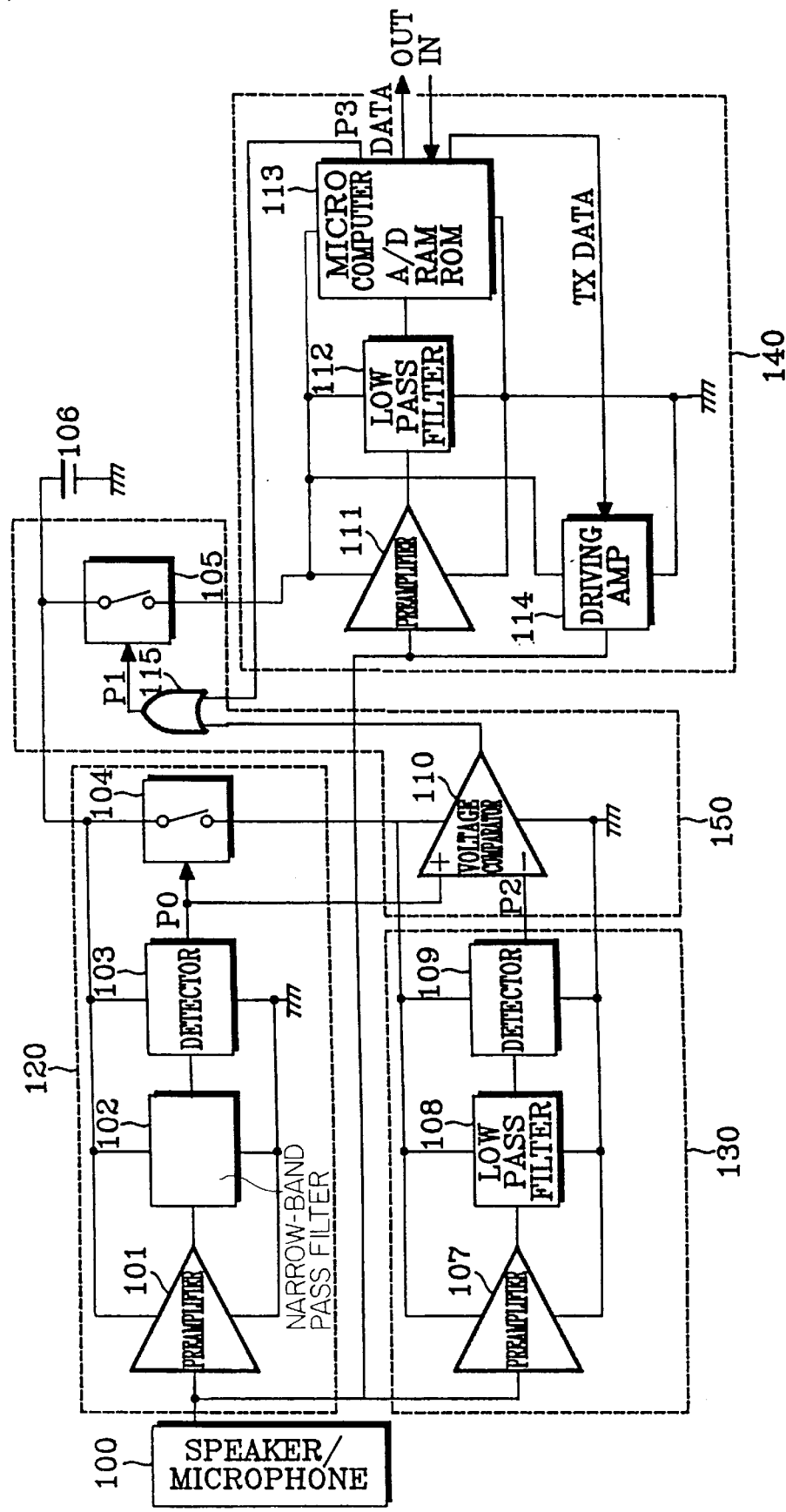
FIG. 1 is a block diagram of an acoustic wave communication apparatus of the present invention.

The following description of the preferred embodiments discloses specific circuit configurations, data values, and components. However, the preferred embodiments are merely examples of the present invention, and thus, the specific components and values described below are only used to more easily describe such embodiments and to provide an overall understanding of the present invention. Accordingly, one skilled in the art will readily recognize that the present invention is not limited to such specific features. Furthermore, the descriptions of various features and structures of the present invention which would be known to one skilled in the art are omitted for the sake of clarity and brevity.

The present invention relates to an acoustic wave communication apparatus. Furthermore, among the many uses of the present invention, the communication apparatus may be incorporated into an alarm system to increase the life of the batteries used in the system and to reduce the interference among signals transmitted and received in the system. A description of an embodiment of the present invention is described below. However, in order to more fully understand the invention, some principles underlying the invention will be described first.

Principles of the Invention

In an alarm system which may incorporate the acoustic wave communication apparatus of the present invention, the expected life of a battery used in the system should preferably be between 5 and 10 years. Therefore, as a result of the shape and capacity of the batteries currently available, the power consumed by a receiver in the system during a reception waiting mode should be reduced to about 10 A.

In the communication apparatus of the present invention, data is transmitted after an acoustic wave (i.e. starting signal) having a predetermined frequency is transmitted. Accordingly, a corresponding receiver is maintained in a reception waiting mode until it detects the starting signal, and after receiving such signal, the receiver switches into a reception mode to receive the data.

In order to receive the starting signal, the receiver may comprise an small electric microphone which is inexpensive and has a high performance. Such a microphone contains a piezoelectric device for electric sound conversion and a field effect transistor (FET) for impedance conversion. However, the above microphone is not practical because it consumes several hundred $\mu A$ of current during the reception waiting mode and much more current when it is used as a microphone. Consequently, the present invention preferably uses a dynamic speaker for receiving and transmitting signals in the alarm system. Specifically, a dynamic speaker is a speaker which can output acoustic waves and also functions like a microphone for inputting acoustic waves. Moreover, the speaker has a very low impedance and does not require a transistor for impedance conversion.

The acoustic wave communication apparatus of the present invention also minimizes the current consumption. Specifically, when the receiver is in the reception waiting mode, power is only supplied to a detection circuit which detects the starting signal having the predetermined frequency. Then, the receiver only supplies power to a data processing circuit for processing data when the starting signal is received.

Furthermore, the communication apparatus comprises a prevention circuit which prevents the detection circuit from erroneously detecting the starting signal. In particular, various devices in an indoor room may produce acoustic waves (i.e. living noise) which have frequencies similar to the predetermined frequency of the starting signal. Examples of such devices may include televisions, audio systems, musical instruments, and vacuum cleaners. By preventing the detection circuit from erroneously detecting the starting signal, the prevention circuit further extends the life of the battery by preventing the detection circuit from mistakenly enabling the current of the battery to be unnecessarily supplied to the data processing circuit.

Another way in which to reduce the probability that living noise is detected as the starting signal is to increase the output of the speaker which is transmitting the starting signal. Therefore, the strength of the starting signal will be stronger in relation to the living noise, and thus, the sensitivity of the receiver may be reduced so that it only detects the starting signal. However, the dynamic speaker cannot produce a very strong output because it has a low efficiency and is driven by the voltage of a battery. Thus, since the maximum power which can be supplied to the speaker by a battery is merely 10 W, the output of the speaker is limited to about 90 phones. Moreover, if the output power of the speaker is 90 phones, a starting signal which is output from the speaker is attenuated to 70 phones when it travels a distance of 10 m.

If the acoustic communication apparatus of the present invention is incorporated into an alarm system, the apparatus must be able to enable a sensor and a reception unit to effectively communicate via acoustic waves. Therefore, since the sensor and reception unit are generally located at least 10 m apart, the present invention provides a manner for detecting a starting signal having a strength of 70 phones which is surrounded by various kinds of living noise.

The false detection of the starting signal by the detecting circuit may also be further prevented by modulating the starting signal into a predetermined format. In this instance, the receiver must contain an additional circuit for demodulating the starting signal. However, the additional demodulation circuit complicates the alarm system, increases power consumed by the receiver, and shortens the life of the battery.

Instead of using the dynamic speaker described above, a speaker employing a piezoelectric device may be considered. However, the output strength of the device is about 70 phones, and therefore, using such device may be impractical in many circumstances. Furthermore, if a device is only used to output signals but not input signals, a piezo-electric buzzer may be used as a transmitter. However, a piezoelectric buzzer cannot be used because the signal-to-noise (S/N) ratio of the signals output by the buzzer is high when they are subjected to living noise. For example, the buzzer has a relatively wide frequency band (e.g. 600–3000 Hz) which is used to communicate data.

In order to overcome the above problems, the acoustic communication apparatus of the present invention comprises a dynamic speaker that outputs a starting signal which is stronger than the signals conveying data. A general dynamic speaker is designed to have a flat frequency characteristic because it is used for sound. Such a flat frequency characteristic is created by reducing the efficiency of the speaker at its natural resonant frequencies. Therefore, the dynamic speaker no longer has output peaks at such resonant frequencies. Furthermore, increasing the output of the speaker at a specific frequency and increasing the output sound pressure by 10 phones at such frequency can be easily achieved without raising the cost of the speaker. Moreover, when the output of the speaker is increased at the specific frequency, the sensitivity of microphone of speaker is proportionally enhanced at such frequency. Consequently, if the starting signal is output at such specific frequency, the microphone can easily discriminate the starting signal from the remaining living noise.

As indicated above, the acoustic wave communication apparatus of the present invention comprises a microphone/dynamic speaker, a battery, a detecting circuit (i.e. a starting signal selection amplifier), a non-starting signal selection amplifier, a power control circuit, and a data processing circuit (i.e. a signal processing circuit). The battery constantly supplies power to the staring signal selection amplifier, and such amplifier detects the starting signals from among the electric signals output from the microphone/dynamic speaker. When the starting signal selection amplifier detects a signal which has the same frequency as the starting signal, the amplifier supplies power to the non-starting signal selection amplifier. Afterwards, the non-starting signal selection amplifier begins to detect signals which are output from the microphone/dynamic speaker and which fall within a "non-starting signal" frequency range. If the signal detected by the starting signal selection amplifier has a higher magnitude than the signal detected by the non-starting signal selection amplifier, the power control circuit supplies the voltage to the signal processing circuit. Then, the signal processing circuit receives and amplifies the data signals which follow the starting signal.

In this instance, the acoustic waves are transmitted and received inside a room, and thus, the starting signal reverberates and reflects off the walls, ceiling, windows, or furniture. Therefore, the reverberation of the signal should be prevented from decreasing the dynamic range of the amplifier contained in the signal processing circuit and from interfering with the subsequent data signals which are received.

Furthermore, the present invention divides the frequency bands of the starting signal and data signal during the transmission of the signal. Moreover, the data amplifier within the signal processing circuit selectively amplifies only the signal in the data frequency band in order to attenuate the frequency band of the starting signal. As a result, the interference between the frequency bands of the starting signal and the data signal is reduced.

The amplified signal in the data frequency band is converted into a digital signal via an analog-to-digital converter, and the digital signal is stored in a memory of the signal processing apparatus. Afterwards, the stored data is filtered by an adaptive filter so that the influence of the starting signal upon the stored data is more completely eliminated.

As described above, the magnitude of the transmitted starting signal can be made to be several times greater than the magnitude of the data signal. Consequently, the instances in which a receiver erroneously supplies power to the signal processing circuit as a result of noise decreases. In addition, the S/N ratio between the starting signal and data signal is balanced. Furthermore, when a starting signal is detected, power is supplied to the non-starting signal selection amplifier. Then, the receiver confirms that no other frequency bands exist which contain signals which have a magnitude greater than or equal to the magnitude of the starting signal. In other words, the receiver confirms that the starting signal selection circuit has actually detected a starting signal instead of detecting noise having the same frequency as the starting signal. Then, only after a starting signal is properly detected, power is supplied to the signal processing circuit. As a result, the acoustic wave communication apparatus does not consume power unnecessarily.

In addition, after the starting signal is transmitted from the microphone/speaker of the transmitter, the signal is reflected off of the walls, ceiling, floor, etc. Accordingly, when the starting signal is transmitted, several acoustic waves are superposed upon the starting signal when it arrives at the microphone/speaker of the receiver. If the phases of the various acoustic waves and the starting signal are the same, the magnitudes of waves are added to the starting signal. Therefore, no problem exists in detecting the starting signal because the magnitude of the wave input to the receiver is increased. However, if the phases of the acoustic waves and the starting signal are opposite, the magnitudes of the acoustic waves and the starting signal cancel each other out. Accordingly, the wave input to the receiver may have a magnitude which is too small to be detected by the receiver. Thus, since the phases of the many reflected waves change as the dimensions and the objects within a room change, consistently receiving valid starting signals is difficult.

The present invention overcomes the problem above by selectively interrupting the transmission of the starting signal in order to irregularly vary the phase differences among the various acoustic waves reflected in the room. By interrupting the transmission of the starting signal, the offset phases of the reflected wave are prevented from decreasing the magnitude of the signal input by the receiver to an extremely small value. Consequently, the receiver can more easily detect the starting signal. In addition, the same result may be obtained by alternately transmitting different frequencies instead of interrupting the predetermined frequency of the starting signal or by simultaneously transmitting multiple frequencies.

As described above, the acoustic waves transmitted by the acoustic wave communication apparatus reflect, diffract, and reverberate off the floor, ceiling, walls, furniture, etc. Accordingly, when a single wave is transmitted, a plurality of delayed waves are generated which are superposed upon the single wave.

Consequently, if data is frequency modulated upon a carrier wave and output via a transmitter as a direct wave, a corresponding receiver can only properly detect and demodulate such data only if the direct wave is received without any corresponding delayed waves. However, if the direct wave is transmitted in a room, many delay waves are present, and the direct wave and the delay waves are superposed on each other when they are input by receiver. Therefore, the receiver cannot easily demodulate the data because of the superposition of the direct and delay waves. In other words, the data transmitted in acoustic waves is difficult to demodulate because it is distorted due to the multipath transmissions, and the waveform distortion of the acoustic waves becomes large.

However, the portion of the direct wave which arrives at the receiver before any of the delay waves can be demodulated, but such portion is extremely small. In particular, even if the direct wave does not reflect off the furniture, walls, ceiling, or floor within the room, a delay wave is produced from the actual speaker which outputs the direct wave. For example, when the direct wave is output from the front of the speaker, a phase-inverted acoustic wave which corresponds to the direct wave is emitted from the back of the speaker. Then, the phase-inverted acoustic wave is reflected from the back plate of the speaker box and emitted from the front of the speaker as a delay wave. Generally, such delay wave trails the direct wave by the reciprocation time of the delay wave within the speaker box (e.g. several hundred microseconds). Since the delay wave arrives at the receiver only several hundred s after the direct wave arrives, only one or two bits of data modulated on the direct wave can be demodulated.

Moreover, since the room contains a ceiling, floor, walls, and furniture, the delay waves continue to reverberate for several hundred milliseconds after the direct wave has stopped being transmitted. Thus, since no data bits can be demodulated by the receiver while the delay waves are reverberating, data can only be demodulated by the receiver at a rate of one or two bits per several hundred milliseconds.

In the present invention, the acoustic wave communication apparatus transmits acoustic waves as binary waveforms. Therefore, the data is transmitted without being modulated onto a carrier, and thus, the receiver does not need to demodulate the acoustic waves to obtain the data. Thus, the present invention does not suffer from the problems above.

Also, in addition to data, the direct wave contains a pseudo-noise sign which immediately follows the data. When the pseudo-noise sign is transmitted in an environment where multipath delay distortion exists, the receiver can determine the delay characteristics of the communication system and accurately obtain the data despite the delay distortion. Specifically, the receiver can input the superposed waves to an adaptive filter and determine the amplitude of direct wave, the amplitude of the delay wave, and the delay time of the delay wave based on the pseudo-noise sign.

For example, the transmitter of the acoustic wave communication apparatus may transmit a direct wave containing a data acoustic wave and a pseudo-noise sign immediately following the data acoustic wave. Subsequently, the receiver receives a reception wave which comprises the direct wave and a delay wave which is superposed on the direct wave. Then, the receiver converts the reception wave into digital data and stores the digital data in memory. Then, the stored data is passed through an adaptive filter to obtain the delay characteristics of the pseudo-noise sign, and the data portion of the direct wave is separated from the pseudo-noise sign portion of the direct wave based on the delay characteristics. Accordingly, the delay distortion of the data acoustic wave can be corrected. As illustrated above, the data portion is located before the pseudo-noise sign portion of the acoustic wave. Then, the data acoustic wave is delay-distorted only by itself, and thus, the delay distortion can be corrected based on the delay characteristics obtained from the pseudo-noise sign portion of the wave.

In addition, even though the delay wave is superposed on the direct wave, the effect of the delay wave is not that substantial if the data portion of the direct wave is shorter than the pseudo-noise sign portion of the direct wave. For instance, if a pseudo-noise sign of the fifth degree M series is used, the length of the sign is 32 chips. Therefore, assuming that the width of one bit of data is equal to the width of one chip, the delay wave barely effects eight bits of data. Also, if pseudo-noise sign of a higher degree is used, more information can be transmitted in the data portion of the direct wave.

The manner in which the present invention corrects the delay distortion of the direct wave will be described below in more detail. Assuming that n represents the number of discrete multipath delay waves, the following equation is satisfied.

$$r(t) = S0(t) + \sum_{i=1}^{n} Si(t - \tau i) \qquad 1$$

where r(t) is a reception wave (i.e. a direct wave and at least one delay wave superposed upon the direct wave) received at a receiver;

S0(t) is a direct wave having an amplitude S0;

Si(t–τi) is the delay wave having an amplitude Si and delay time τi; and i represents the number of a delay wave (i.e. i is an integer greater than zero).

If a pseudo-noise sign exists in the reception wave r(t) and passes through an adaptive filter corresponding to the pseudo-noise sign, a peak corresponding to the amplitude S0 of the direct wave appears at the time τ0 at which the pseudo-noise sign arrives. Also, a peak corresponding to the amplitude Si of the delay signal i appears at the time τi at which the delay wave arrives. Therefore, assuming that the length of the data within the direct wave is $D_L$, the portion of the reception wave r(t) defined by the interval $[\tau 0 - D_L, \tau 0]$ is data acoustic wave.

Accordingly, the data acoustic wave can be extracted from the reception wave r(t) and temporarily stored in the memory. If the data acoustic wave is designated d(t), the following equation (2) is satisfied because the data acoustic wave d(t) and the pseudo-noise sign are sequential. Thus, their delay characteristics are regarded as same.

$$d(t) = S0 \cdot d0(t) + \sum_{i=1}^{n} Si \cdot d0(t - \tau i) \qquad 2$$

where

S0d0(t) is a direct wave; and d0(t) is a reception data waveform in unit amplitude.

If equation (2) is changed in terms of correcting the delay distortion of the data, equation (3) can be expressed as follows.

$$SO \cdot d0(t) = d(t) - \sum_{i=1}^{n} Si \cdot d0(t - \tau i) \qquad (3)$$

If S0d0(t)=d(t) is sequentially calculated from equation (3) during the interval 0 t τ1, the direct wave S0d0(t) can be obtained from the reception wave comprising the direct wave S0d0(t) on which the delay wave is superposed. In other words, the delay distortion of the direct wave S0d0(t) can be corrected.

When the amplitude Si and the delay time τi of the delay wave i are obtained by calculating the reception wave and the pseudo-noise sign in accordance with the corresponding adaptive filter, errors may exist in the amplitude Si and the delay time τi. In order to reduce the amount of errors, a pseudo-noise sign having a higher degree should be used, and the number of chips should be increased. However, increasing the degree and the number of chips increases the length of the pseudo-noise sign, increases the amount of memory needed to temporarily store the reception wave, and increases the calculation time of the adaptive filter. In addition, when the pseudo-noise sign is lengthened, the delay distortion of such sign increases. Consequently, limitations may exist for using a pseudo-noise sign having a higher degree.

As shown by the right side of equation (3), errors are accumulated as the number of the delay waves i increases, and demodulation of the data is difficult to perform as the bits advance. Also, the term in the right side of equation (3) represents a binary transmission wave having an amplitude Si and indicates the superposition of a delay wave. Furthermore, in equation (3), the accumulation of errors can be prevented by bit-judgement of a direct wave S0d0(t) in the order of a bit having a lapse of time t and by replacing Sid0(t−τi) with a binary transmission waveform corresponding to the transmission bit.

Also, since the dynamic speaker of the present invention its miniaturized and incorporates a microphone, its bandwidth is limited. Assuming that the reception wave is not delayed because a separation filter for separating the starting signal and data signal is used in the signal processing circuit, determining whether the bit center of the direct wave S0d0(t) is a logic "0" or "1" is difficult. For example, such determination may be difficult because the straight wave is distorted sharply as compared with the binary transmission wave.

In order to overcome the above problem, the present invention may previously determine a reception wave corresponding to a logic "0" or "1" from the step response wave of the serial transmission system. Also, such determination may be made separately from determining the delay distortion caused during aerial propagation. Then, the logic "0" or "1" of the predetermined step response wave and the straight wave S0d0(t) calculated in equation (3) are compared for bit judgement, and the logic "0" or "1" of transmission wave is estimated.

As explained above, the acoustic wave communication apparatus of the present invention prevents errors from being accumulated in the delay distortion correcting calculation. Furthermore, the invention also enables a binary sign to be demodulated in a extremely reliable manner. Such demodulation is reliable even in consideration of the distortion caused by the speaker, microphone, and amplifier of the transmitter.

Until now, correcting the delay distortion by estimating the amplitude Si and delay time τi of a delay wave from multiple peak signals has been explained. However, some problems may exist in estimating the amplitude Si and the delay time τi.

For instance, the acoustic wave emitted from the speaker is propagated in the air, and the delay wave reflected by the floor is re-diffused. Consequently, the peak of the response wave output from the adaptive filter has a certain width. Thus, strictly speaking, numerous delay waves which are impossible to separate may be present in one peak. As a result, assuming that the peak of the response wave and the amplitude Si and delay time τi of the delay wave represent a genuine delay wave may be difficult. In addition, correcting the delay distortion pursuant to equation (3) on the basis of such assumption above may be inaccurate. Moreover, within a room, a plurality of peaks actually have a complicated relationship with each other, and thus, separating and estimating multiple delay waves from one peak on the basis of the width of the peak is practically impossible.

In order to solve the problem caused by the diffusion of indoor acoustic waves, a distortion correcting error should be defined pursuant to equation (4) below. Specifically, when the delay distortion is corrected in equation (3), the term "d0(t−τi)" is determined sequentially "0", "1". Furthermore, the term is replaced with a transmission waveform in order to prevent noise or a calculation error superposed in the reception wave from being diffused to the following bit. If the replaced transmission waveform is defined as S0BW(t) and the difference between it and the direct wave S0d0(t) obtained in equation (3) is deemed to be the distortion correcting error ERR(t), then, equation (4) is defined as follows.

$$ERR(t)=S0d0(t)-S0BW(t) \qquad (4)$$

In equation (4) the term S0d0(t) corresponds to the reception wave without the delay wave (i.e. the direct wave), and thus, it contains an error caused by the diffusion of indoor noise, the amplitude Si of delay wave, and the delay time τi of delay wave. The term S0BW(t) corresponds to the reception wave without the delay distortion which is estimated based on the amplitude Si of delay wave and delay time τi of delay wave. If no noise exists within the room and the amplitude Si and delay time τi of delay wave are the actual amplitude and delay time of delay wave, then the term S0d0(t) equals the term S0BW(t), and the delay distortion correcting error ERR(t) equals zero.

In light of the discussion above, the diffusion of an acoustic wave can be suitably corrected as follows. First, the distortion should be corrected in equation (3) by analyzing the amplitude Si and delay time τi and dividing the amplitude Si and delay time τi into the amplitudes Si0 and Si1 and the delay times τi0 and τi1 based on the width or superposition of the peak of the response wave of the adaptive filter. Then, the distortion should be re-corrected by changing the amplitudes Si0 and Si1 and the time delays τi0 and τi1 to minimize the delay distortion correcting error ERR(t) defined by equation (4).

On the other hand, estimating the delay distortion correcting error ERR(t) can be achieved by taking the absolute value of the error and summing all of the bits. For instance, the absolute value ERR(t) is minimized through summing. Then, if the amplitude Si and delay time τi of delay wave are corrected while the error is evaluated bit by bit, even the bit error can be corrected. If the value of the delay distortion correcting error ERR(t) does not become less than a predetermined value after serial corrections, a data error is deemed to have occurred. As described above, the present invention enables the delay distortion caused by acoustic wave diffusion to be precisely and reliably corrected.

The pseudo-noise sign described above may be combined with the adaptive filter to maximize the S/N ratio in an area where random noise exists. If a pseudo-noise sign having a high degree is used, error-free communication can be achieved even if the level of noise is higher than the level of the reception wave. However, the data acoustic wave which precedes the pseudo-noise sign has no protection against noise. Therefore, in order for the data acoustic wave to achieve an S/N ratio equal to the S/N ratio of the pseudo-noise sign, a signal level several times the pseudo-noise sign is required. However, generating such a large signal is impossible due to the limitations of the transmission system.

In the invention, the S/N ratio of data acoustic wave is enhanced by repeating the transmission of the same signal. Specifically, if the data portion is derived whenever the signal is received and if the signals of the same phase are summed and averaged, then such average value D(t) can be defined by equation (5) when noise is superposed on the data wave.

$$D(t) = \sum_{i=1}^{n} di(t)/j + \sum_{i=1}^{n} ni(t)/j \tag{5}$$

In equation (5), di(t) represents the acoustic wave of the reception data, ni(t) represents random noise, and j indicates the number of the acoustic wave transmissions. If there is no change in delay characteristics, the first term di(t) is a constant value regardless of the value of j. Also, since the second term ni(t) represents random noise, it approaches "0" as the value of j increases. Consequently, the noise component is negligible in calculating the average value D(t) if j is large.

Embodiments

A preferred embodiment of the present invention will now be described in detail with reference to the attached drawings. FIG. 1 shows a transmitter/receiver for effectively implementing acoustic communication in a wireless crime/disaster system.

As shown in FIG. 1, the transmitter/receiver comprises a dynamic microphone/speaker 100, a starting signal selection amplifier 120, a non-starting signal selection amplifier 130, a signal processing circuit 140, a power control circuit 150, and a battery 106. The microphone/speaker 100 is capable of transmitting and receiving acoustic signals. Specifically, the microphone/speaker 100 acts as a microphone when it receives acoustic signals and acts as a speaker when it transmits acoustic signals. Accordingly, the microphone/speaker 100 will be referred to as a microphone 100 when it is receiving signals and will be referred to as a speaker 100 when it is transmitting signals.

The starting signal selection amplifier 120 detects a starting signal having a predetermined frequency band (e.g. 4 Khz) from among the various signals output from the microphone 100. As shown in the figure, the amplifier 120 comprises a preamplifier 101, a narrow band pass filter 102, a diode detector 103, and a switch 104.

The preamplifier 101 inputs signals from the microphone 100, and outputs a first preamplified signal to the filter 102. The filter 102 passes the preamplified signal only if it has a frequency which falls within a narrow band of frequencies (e.g. 4 KHz) and outputs a corresponding first filtered signal. The detector 103 inputs the filtered signal and outputs a first detection signal P0 in response to the value of the filtered signal. The signal P0 is supplied to the switch 104 to control whether the switch 104 is opened or closed.

The preamplifier 101, the narrow band pass filter 102, and the diode detector 103 constantly receive power from the battery 106 and wait to receive a signal having a particular frequency (i.e. the starting signal) in a reception waiting state. When the starting signal is input by the microphone 100, the corresponding detection signal P0 closes the switch 104, and the power of the battery 106 is output via the switch 104 to the non-starting signal selection amplifier 130.

The non-starting signal selection amplifier 130 detects an acoustic wave output from the microphone 100 which has a frequency band which is different from the frequency band of the starting signal. The amplifier 130 comprises a preamplifier 107, a low pass filter 108, and a diode detector 109.

The preamplifier 107 also inputs signals from the microphone 100, and outputs a second preamplified signal to the low pass filter 108. The filter 108 passes the preamplified signal only if it has a frequency which is lower than a certain frequency (e.g. 2.5 KHz) and outputs a corresponding second filtered signal. The detector 109 inputs the filtered signal and outputs a second detection signal P2 in response to the value of the filtered signal.

The power inputs of the preamplifier 107, the low pass filter 108, and the diode detector 109 are connected to the output terminal of the switch 104. Accordingly, power is only supplied to such devices when the microphone 100 receives a starting signal, thereby causing the detector 103 to output the first detection signal P0.

The signal processing circuit 140 amplifies and demodulates received data input via the microphone 100, modulates and transmits transmission data via the speaker 100, and determines the manner in which power is supplied from the battery 106 to various components. The signal processing circuit 140 comprises a preamplifier 111, a low pass filter 112, a microcomputer 113, and a driving amplifier (i.e. speaker driver) 114.

The preamplifier 111 inputs the starting signal and a subsequent reception wave from the microphone 100, amplifies such signals, and outputs a third amplified signal. The low pass filter 112 inputs the amplified signal, separates the reception wave from the starting signal, and outputs a corresponding third filtered signal. The microcomputer 113 has an internal analog to digital (A/D) converter, a random access memory (RAM), and a read only memory (ROM) and inputs and processes the filtered signal. The processed signal may then be output via an output port OUT. In addition, the microcomputer 113 inputs data from an input port IN, processes such data, and outputs corresponding transmission data. The speaker driver 114 inputs the transmission data and drives the speaker 100 in accordance with the transmission data.

The power control circuit 150 determines if the level of the starting signal detected by the starting signal selection amplifier 120 is greater than the non-starting signal detected by the non-starting signal selection amplifier 130. Moreover, the circuit 150 supplies power to the signal processing circuit 140 when the starting signal is greater that the non-starting signal. The power control circuit 150 comprises a power control switch 105, a comparator 110, and an OR gate 115.

The comparator 110 inputs the first detection signal P0 and the second detection signal P2 and outputs a first power control signal if the signal P0 is greater than the signal P2 (i.e. if the level of the starting signal is greater than the level of the non-starting signal). The OR gate 115 inputs the first power control signal and outputs a corresponding resultant power control signal P1 which closes the switch 105. When the switch 105 closes, power from the battery 106 is supplied to the preamplifier 111, filter 112, microcomputer 113, and speaker driver 114. In addition, a second power control signal is output from the microcomputer 113 after it has initially received power, and such signal is output by the OR gate 115 as the resultant power control signal P1 to keep the switch 105 closed.

The acoustic communication apparatus illustrated in FIG. 1 may be connected to both a sensor and a reception portion (i.e. central portion) of crime prevention system, and data communication may be performed by transmitting and receiving acoustic waves between the two acoustic communication apparatuses. The apparatus connected to the reception portion does not require a battery 106 because the electrical power of the household may be directly supplied to the reception portion. The acoustic communication apparatus connected to the sensor randomly or periodically receives a control signal (e.g. a crime prevention condition start signal, a crime prevention condition end signal, or a sensor checking signal) from the acoustic communication apparatus connected to the reception portion.

In the present embodiment, the acoustic signals transmitted between the reception portion and sensor are divided into starting signal and data signal. In particular, when signals are sent to the sensor from the reception portion, a starting signal having a specific frequency band (e.g. 4 Khz) is transmitted initially. Then, the acoustic communication apparatus connected to the sensor is activated when the starting signal is received. Subsequently, the data signal is transmitted to the sensor.

More specifically, before the starting signal is received, the starting signal selection amplifier 120 is in a reception waiting state. In such state, the switches 104 and 105 are open, and thus, the power voltage of battery 106 is supplied only to the components of the starting signal selection amplifier 120 and is not supplied to the non-starting signal selection amplifier 130 and the signal processing circuit 140.

When a starting signal having a predetermined band (e.g. 4 KHz) and a subsequent data signal are transmitted from the reception portion, the microphone 100 receives the corresponding acoustic wave and converts it into an electric signal. The electric signal is output to both the starting signal selection amplifier 120, the non-starting signal selection amplifier 130, and the signal processing circuit 140.

Figure 2A:
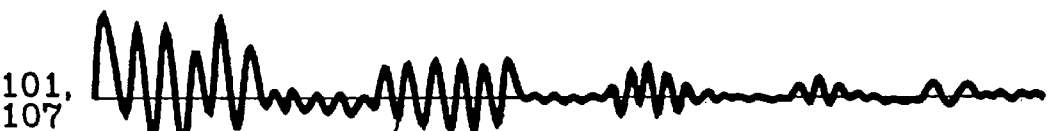
FIG. 2A is a waveform of the output of the preamplifier 101 or 107 shown in FIG. 1 during a noise free environment.
Figure 2B:
FIG. 2B is a waveform of the output of the narrow band pass filter 102 shown in FIG. 1 during a noise free environment.

In a noise free environment, the amplifier 120, the amplifier 130, the processing circuit 140, and the power control circuit 150 process the electric signal from the microphone 100 to produce the various signals illustrated in FIGS. 2A to 2G. Specifically, in the amplifier 120, the preamplifier 101 amplifies the electric signal to a predetermined level and outputs the first preamplified signal. As shown in FIG. 2A, the first preamplified signal comprises a starting signal having a starting signal frequency fs and a reception wave having a data signal RDD. As shown in FIG. 2B, the narrow-band pass filter 102 inputs the amplified signal and passes only the portion of the signal which has a frequency that equals the frequency fs of the starting signal. For instance, the filter 102 may be designed to pass only a signal having a frequency which equals approximately 4 KHz.

Figure 2C:
FIG. 2C is a waveform of the output of the detector 103 shown in FIG. 1 during a noise free environment.
Figure 2D:
FIG. 2D is a waveform of the output of the detector 109 shown in FIG. 1 during a noise free environment.
Figure 2E:
FIG. 2E is a waveform of the output of the comparator 110 shown in FIG. 1 during a noise free environment.

The detector 103 inputs the first filtered signal, detects such signal, and outputs the first detection signal P0 shown in FIG. 2C. For instance, the detector 103 may output a HIGH signal when the starting signal is input so that power control switch 104 is closed. The detector 103 can be easily implemented with a resistor, diode, and capacitor such that it has integration and diode detection functions.

When the power control switch 104 is turned on, the power voltage of battery 106 is supplied to the non-starting signal selection amplifier 130. Accordingly, the preamplifier 107 amplifies the electric signal output from the microphone 100 to produce the second preamplified signal shown in FIG. 2A. The low pass filter 108 passes only the portions of the preamplified signal which have frequencies lower than a predetermined frequency (e.g. 2.5 KHz) to produce the second filtered signal. Then, the detector 109 detects the filtered signal and outputs the corresponding second detection signal P2 shown in FIG. 2D. Accordingly, when the microphone 100 inputs acoustic signals having frequencies which are below the predetermined frequency of the low pass filter 108, the signal P2 is produced.

As described above, when the acoustic wave of the starting signal has no noise, the first detection signal P0 output from the detector 103 of the starting signal selection amplifier 120 has a HIGH level, and the second detection signal P2 output from the detector 109 of the non-starting signal selection amplifier 130 has a LOW level. In such a noise-free state, the first detection signal P0 is greater than second detection signal P2. Therefore, when the starting signal having the starting signal frequency fs is received, the comparator 110 outputs the first power control signal (FIG. 2E), the OR gate 115 outputs the resultant power control signal P1 (FIG. 2F), and the power control switch 105 is closed.

Figure 2F:
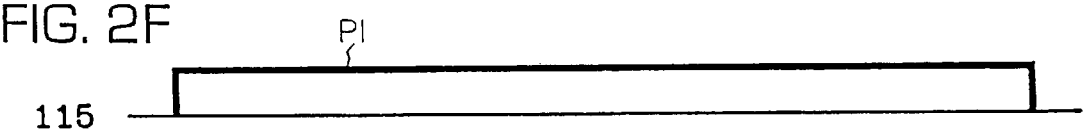
FIG. 2F is a waveform of the output of the OR gate 115 shown in FIG. 1 during a noise free environment.
Figure 2G:
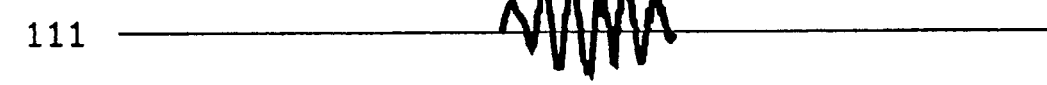
FIG. 2G is a waveform of the output of the preamplifier 111 shown in FIG. 1 during a noise free environment.

When the switch 105 is closed, the power voltage of the battery 106 is supplied to the signal processing circuit 140, and the microcomputer 113 generates a second power control signal P3 after receiving the power voltage. The signal P3 is output to the OR gate 115, and in response, the gate 115 outputs the power control signal P1 (FIG. 2F). As a result, power is continuously supplied from the battery 106 to the signal processing circuit 140 even after the starting signal is no longer input from the microphone 100. Consequently, data signal following the starting signal can be input to the processing circuit 140 and processed.

If the starting signal is not actually transmitted and noise having frequencies that encompass the starting signal frequency fs is received by the microphone 100, the amplifiers 120 and 130, the processing circuit 140, and the power control circuit 150 process the electric signal from the microphone 100 to produce the various signals illustrated in FIGS. 2H to 2M. Specifically, the starting signal selection amplifier 120 inputs the noise, and the preamplifier 101 amplifies the noise to produce the first amplified signal (FIG. 2H). Then the narrow band filter 102 filters out the component of the noise which has the frequency fs (e.g. 4 KHz) to produce the first filtered signal (FIG. 2I). The detector 103 inputs the first filtered signal and outputs the first detection signal P0 (FIG. 2J) to close the switch 104. As a result, the power voltage is supplied from the battery 106 to the non-starting signal selection amplifier 130.

Upon receiving power, the preamplifier 107 of the amplifier 120 amplifies the noise and outputs the second preamplified signal (FIG. 2H). Then, the low pass filter 108 inputs the preamplified signal and passes the components of the noise which have a frequency less than a certain frequency (e.g. 2.5 KHz) to generate the second filtered signal (FIG. 2K). Afterward, the detector 109 inputs the filtered signal and outputs the second detection signal P2 (FIG. 2L).

When noise having components containing frequencies that equal the starting signal frequency fs is received, the first detection signal P0 is smaller than or equal to the second detection signal P2. Accordingly, the comparator 110 outputs the first power control signal which is LOW as shown in FIG. 2M. As a result, the power control signal P1 output from the OR gate 115 is LOW, and the power control switch 105 remains open. Thus, power is not supplied to signal processing circuit 140 and is automatically cut off from the non-starting signal selection amplifier 130 when the noise having the starting signal frequency fs component disappears.

In a crime/disaster prevention system, the sensor of the acoustic communication apparatus receives the starting signal from the reception portion several times per day. Accordingly, the starting and non-starting signal selection amplifiers 120 and 130 corresponding to the sensor operate several times per day for several seconds when the starting signal is received. As a result, the overall power consumption of the acoustic communication apparatus of the present invention can be reduced by decreasing the power consumption of starting signal selection amplifier 120. Setting the power consumption of the amplifier 120 to be several A can be easily accomplished with a simple circuit configuration in which the detector 103 is incorporated with the low pass filter 102. Also, if the acoustic communication apparatus is implemented with an inexpensive integrated circuit, the power consumed by the non-starting signal selection amplifier 130 is usually several hundred A, and the power consumed by the signal processing circuit 140 is several mA.

The acoustic communication apparatus of the present invention minimizes the consumption of power by comparing the detection signals P0 and P2 output from the starting and non-starting signal selection amplifiers 120 and 130 in order to prevent the inadvertent operation of the signal processing circuit 140 due to noise. Furthermore, the acoustic communication apparatus is designed to minimize the consumption of the power of the battery 106 even when a strong noise that is very close to the frequency of the starting signal is received. For instance, when a strong noise (e.g. the sound of a piano) has characteristics which are similar to the properties of the starting signal, the power voltage of battery 106 is supplied to the signal processing circuit 140 if the detection signal P0 is not smaller than the signal P2. In such case, the microcomputer 113 of signal processing circuit 140 detects whether a predetermined data signal is received following the starting signal. If such signal is not received, the microcomputer 113 does not output the second power control signal P3, and thus, the resultant power control signal P1 output from the OR gate 115 becomes low when the noise ceases. Thus, the switch 105 is opened, and power is no longer supplied to the circuit 140. An example of minimizing the power consumption of battery 106 according to the above operation will be explained below.

Suppose that the duration of the starting signal is 30 ms, the time until the voltage of battery 106 is supplied to the non-starting signal selection amplifier 130 after the starting signal is received is 15 ms, the time to supply such voltage to the signal processing circuit 140 after the starting signal is received is 20 ms, and time for the signal processing circuit 140 to detect whether data is received or not is 100 ms. In addition, assume that the power consumed by the starting signal selection amplifier 120, the non-starting signal selection amplifier 130, and signal processing circuit 140 are 5 A, 500 A, and 10 mA, respectively. Furthermore, assume that the non-starting signal selection amplifier 130 operates an average of 1,000 times per day due to noise, and that the average time for which the amplifier 130 operates is 100 ms. Finally, assume that the number of times the that the signal processing circuit 140 operates is 100 times due to noise having characteristics similar to the properties of the starting signal. As a result of the above assumptions, the average power Iw consumed can be calculated as follows.

$$Iw = 5 \ \mu A + \frac{100 \ ms \times 500 \ \mu A \times 1000}{24 \times 3600 \times 1000 \ ms} + \frac{100 \ ms \times 5000 \ \mu A \times 100}{23 \times 3600 \times 1000 \ ms} = 6.16 \ \mu A$$

According to the above equation, the power consumed during the reception waiting state is determined as the power consumed by starting signal selection amplifier 120 as well as the power consumed during inadvertent operation caused by noise. Also, one can accurately assume that the transmission portion of the circuit operates an average of ten times per day and that such operations encompass the functions of crime prevention state start/end, confirmation of sensor operation, and retransmission. Assuming that the duration of the transmitted starting signal is 30 ms, the duration of the data signal is 10 ms, and the driving current of the speaker is 1.5 A (battery voltage is 6V and speaker input 9 W), the average current It consumed by the transmission portion can be expressed as follows.

$$It = \frac{1.5 \ A \times 40 \ ms \times 10}{24 \times 3600 \times 1000 \ ms} = 6.94 \ \mu A$$

Accordingly, the average power consumed by the acoustic wave communication apparatus in the sensor is estimated to be about 14 A (i.e. approximately 6.16 $\mu$A+6.94 $\mu$A). Thus, the useful life of the battery 106 within the sensor is about 10 years when a commercial ritium battery for a camera is used. (The outer dimensions of such battery is 33×20×35 mm, and the voltage of such battery is 6V).

The microphone/speaker 100 will now be explained with reference to FIG. 3. The figure represents a graph of the output characteristics of the speaker 100. Also, the horizontal axis of the graph represents frequency, and the vertical axis represents the output of the speaker. As described above, the speaker 100 of the present invention can also act as a microphone 100 without being modified.

Figure 3:
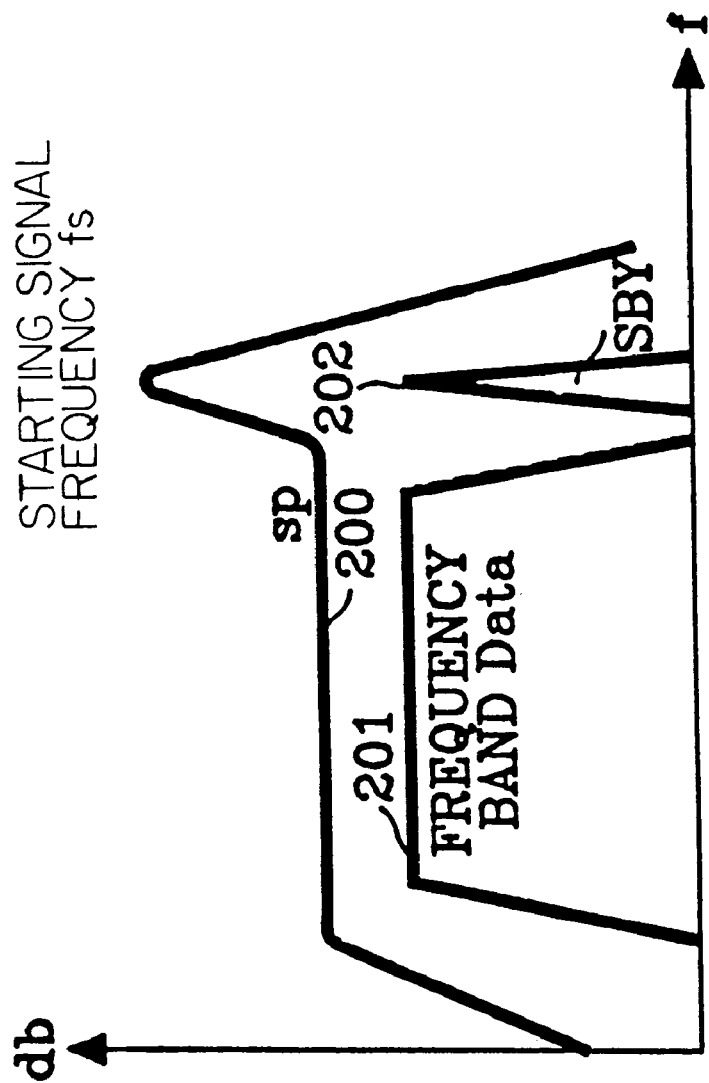
FIG. 3 is a graph of the relationship between the output characteristic and signal distribution of the speaker/microphone 100 shown in FIG. 1.

In FIG. 3, the graph illustrates the output 200 of the speaker 100, the frequency band 201 used for data communication, and the frequency band 202 of the starting signal. As shown in the graph, the output 200 is maximized at the frequency fs of the starting signal due to the characteristic of speaker 100. Also, the frequency band of the starting signal is narrower and has a higher output sensitivity than the frequency band used for data communication. As explained below, a speaker 100 having the above characteristics is appropriate because the present embodiment uses a pseudo-noise sign which has a wide frequency band in order to correct the multipath delay distortion in data communication and because the starting signal is used as a low band signal which is close to a single tone so that the power consumed by starting signal selection amplifier 120 is reduced to detecting only the starting signal. More specifically, since the speaker 100 has a very simple configuration, increasing the transmission output of speaker 100 as much as possible is preferred in order not to make the starting signal selection amplifier 120 inadvertently operate due to the sound of an instrument such as a piano, a television, or stereo devices. In addition, it is known that the pseudo-noise sign used in data communication has a maximum signal-to-noise (S/N) ratio among random noises, such as indoor noise, and thus, a starting signal which is not modulated at all requires its output to be several times greater than the output of the data communication in order to ensure that its S/N ratio equal to that of the pseudo-noise sign. For reliable operation of the crime/disaster prevention system, the speaker 100 is preferably 30 to 50 mm in diameter so that the speaker is as small as possible in comparison with the sensor in order not to be recognized by outsiders.

A general speaker has inherent resonant frequencies due to the cone paper and moving coil contained in the speaker but is designed to suppress resonant points according to instructions by an audio system. When designing the speaker 100 to have the characteristic shown in FIG. 3, the speaker 100 is constructed so that it does not suppress resonance but fosters resonance at the high frequency band fs. Also, it is constructed so that the output characteristic at the frequency fs has about a 10 dB peak without adding a new component. For instance, the 10 dB peak can be obtained by changing only the material and shape of the cone paper in the speaker 100. A similar sized peak can also be obtained in the reception sensitivity of the speaker 100 at the starting signal frequency fs because the speaker 100 is also used as the microphone 100. Such construction improves the S/N ratio of the starting signal receiver.

Figure 4A:
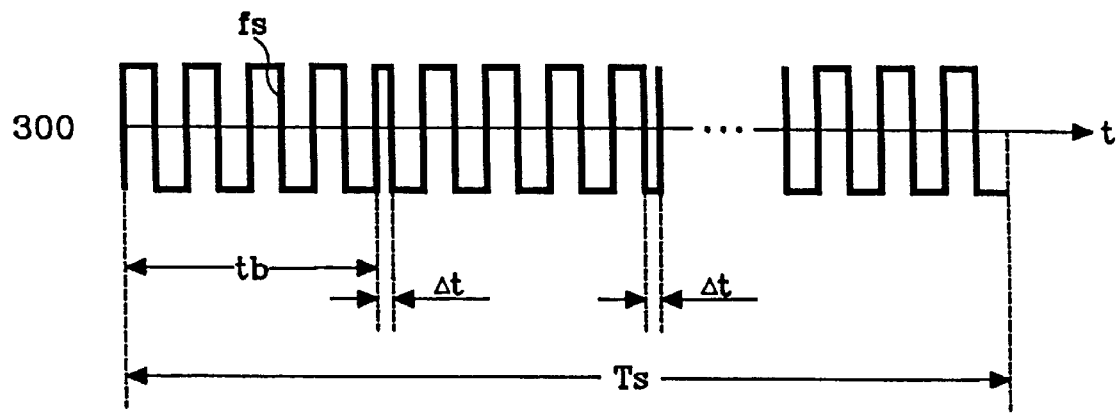
FIG. 4A illustrates a waveform of a starting signal according to the present invention.
Figure 4B:
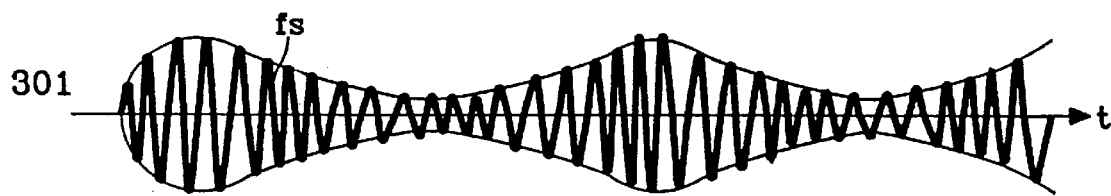
FIG. 4B illustrates a waveform of a received starting signal which has been affected by fading when the frequency of the starting signal is constant.
Figure 4C:
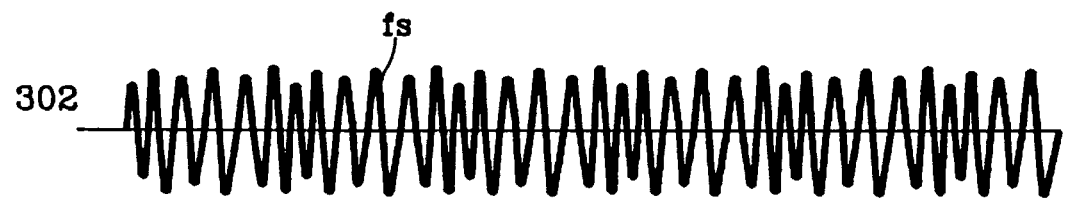
FIG. 4C illustrates a waveform of a received starting signal when the frequency of starting signal is interrupted for a predetermined interruption time.

The starting signal used in the present embodiment will be described in conjunction with FIGS. 4A to 4C. In the figures, the vertical axis represents amplitude, and the horizontal axis represents time. FIG. 4A shows an initial starting signal 300 which is output from the speaker driver 114 of the acoustic wave communication apparatus located in the reception portion of the system. Specifically, the signal 300 comprises a plurality of basic periods tb which are separated by interruption times t. The signal 300 has a duration equal to Ts, and each of the basic periods tb has a frequency which equals the starting signal frequency fs. Furthermore, the interruption times t are set at times which are different from the time 1/(2 fs).

If the starting signal 300 consists only of the basic frequency fs with no interruption time t, the acoustic wave emitted in the air suffers from fading due to its reflection off of the wall, floor, and furniture, and thus, the amplitude of the reception wave is varied greatly. FIG. 4B shows an example of a reception wave 301 suffering from fading. Since the amplitude of the wave 301 experiences fading, the reception of such wave 301 is unstable because the fading varies with reflections occurring between the transmitter and receiver of the acoustic wave communication apparatus. Accordingly, the phases of the various reflection waves sometimes become 180 degrees out of phase with each other, and the corresponding points of the waves cancel each other out and become extinguished due to the change of the interior arrangement of the room. Thus, the amplitude of the reception waves becomes nearly "0", even when the reflection waves are in phase and have their amplitudes increased.

In order to overcome the problem above, the speaker driver 114 amplifies and outputs the starting signal 300 from signal processing circuit 140 and drives the speaker 100. When the speaker 100 is driven with the signal 300, the reception wave received by the microphone 100 resembles the reception wave 302 shown in FIG. 4C. Specifically, when the microcomputer 113 outputs the starting signal 300 to drive the speaker 100, it provides the signal 300 with the interruption times t which interrupt the basic periods tb. As a result, the phases between the reflection waves vary so that the amplitude of the portions of the reception wave 302 which arrives at the microphone 100 does not become large as shown in FIG. 4B and so that the reception wave 302 becomes stable and has an amplitude that varies only a small amount as shown in FIG. 4C. In other words, if communication is initiated by transmitting the starting signal 300, the starting signal 300 can be accurately received even though the indoor environment is changed and varies the manner in which the reception wave 302 carrying the starting signal has been reflected.

In the case of a portable communication apparatus, no communication problems exist because communication can be resumed while moving to a place where the amplitude becomes larger. Moreover, in the case in which the communication apparatus is fixed as in the present embodiment, communication resumption is impossible when the amplitude is too small for communication. In such a situation, the method described above can effectively prevent such problem.

As illustrated above, the present invention prevents the effects of fading by interrupting the basic period tb of the starting signal 300. However, the same effect may be obtained by changing the basic frequency fs after every period tb or by driving the speaker 100 with a starting signal having multiple frequency components.

Various manners and formats in which the present embodiment performs data communication will be described below. FIG. 5A shows an illustrative embodiment of the configuration of a data signal 400 used in data communication. In the figure, the vertical axis represents amplitude, and the horizontal axis represents time.

The data signal 400 comprises a binary data portion DATA ("1010101") and a pseudo-noise sign PN. Also, the data portion DATA has a duration dt, and the sign PN has a duration pt. The data portion DATA is input to the microcomputer 113 via its IN port, and the microcomputer 113 appends the pseudo-noise sign PN to such portion DATA in order to produce the data signal 400. Then, the signal 400 is transmitted via speaker driver 114 and speaker 100. In the present embodiment, the pseudo-noise sign PN is selected from the fifth degree M series signs, and the sign length is 31 chips. The bit width of data portion DATA and the chip width of chips of the sign PN are equal, and thus, the length of the transmission signal 400 is 38 chips.

If the frequency fs of the starting signal 300 is set to be 4 KHz, and the starting signal 300 (FIG. 4A) is output via the speaker 100 having the characteristic shown in FIG. 3, then the signal reflects off of the interior of the room and produces various delay waves. Since the data signal 400 is output after the starting signal 300, it is superposed on a delay wave of the signal 300. Therefore, the data signal 400 must be separated from the delay wave in the receiver of the acoustic wave communication apparatus.

In order to appropriately separate the data signal 400 from the starting signal 300, the frequency band of the data signal 400 should preferably be separated from frequency fs of the starting signal 300. For example, if the chip width of the pseudo-noise sign PN is 400 s, the properties of pseudo-noise sign PN indicate that the effective component of the frequency of the sign PN is almost uniformly distributed within the range of about 0.5–2.5 KHz. Thus, since the bit width of the data DATA and the width of chip are the same, if the upper frequency of the band of data DATA is 2.5 KHz, the starting signal 300 can be easily separated from the data signal 400. Moreover, the low band component needs a low frequency component as the bit length of data elongates. For instance, if seven bits of the same data value are transmitted (i.e. "0000000" or "1111111"), such transmission is the same as transmitting one 2.8 ms pulse. Accordingly, at least a 300 Hz component is required. Furthermore, when a small speaker is based, the lowest frequency at which signals can be smoothly transmitted is 600 Hz, and thus, transmitting seven bits may unfavorable in the present example.

However, the above problem can be solved as explained below. FIG. 5B shows a reception waveform 401 which is amplified by the data amplifier 111 of the signal processing circuit 140 and then separated from the starting signal 300 via the low pass filter 112 having a cutoff frequency of 2.5 KHz. Also, the waveform 401 is an example of the reception wave which is received by the microphone when the speaker 100 of a corresponding transmitter is driven with the data signal 400. As described above, the data signal 400 is produced by the microcomputer 113. Specifically, the microcomputer 113 receives binary data via its data input port IN and adds a predetermined pseudo-noise sign PN to the received data. Then, the resultant data signal 400 is output to the speaker driver 114, and the speaker driver 114 drives the speaker 100 in accordance with the level of the data signal 400. In response, the speaker 100 transmits a corresponding acoustic wave indoors.

When the acoustic wave is transmitted indoors, is advances towards the microphone 100 after reflecting off the speaker 100 itself, the ceiling, the walls, the floor, and/or the furniture. Then, the acoustic wave arrives at the microphone 100 of the acoustic wave communication apparatus of the sensor as the reception waveform 401. In other words, the acoustic wave transmitted from speaker 100 of the transmitter is mixed with a multipath delay wave and arrives at the microphone 100 of the receiver as the severely distorted waveform 401. In FIG. 5B, the reference designation RDD (t) of the reception wave 401 corresponds to the portion of the reception wave 401 in which the data DATA of the data signal 400 is contained. Also, the reference designation RD(t) of the wave 401 relates to the portion of the reception wave 401 which contains the pseudo-noise sign PN of the data signal 400. Furthermore, the portion RD(t) contains the delay wave of the data signal 400.

For convenience, the time origins of the data signal 400 and the reception waveform 401 coincide with the beginning of the data DATA in the drawings. However, the reception wave 401 becomes elongated due to the delay wave. Moreover, based on the indoor situation, the reception wave 401 sometimes becomes over ten times greater than the original transmission data signal 400. Therefore, accurately determining the initial point of the data DATA contained in the reception wave 401 is difficult due to the effect of indoor noise. In the following description, the extraction of the initial portion RDD(t) of the reception wave 401 from the remainder of the wave 401 and correcting the distortion of such portion RDD(t) will be described in detail.

FIG. 6 shows an example of the internal configuration and function of the microcomputer 113. Specifically, the microcomputer comprises an A/D converter and RAM ("digital conversion/storage portion") 403, an adaptive filter 404, a value extraction device 405, and a delay distortion correcting portion 406. When the reception wave 401 is input via the microphone 100 and supplied to microcomputer 113, the reception wave 401 is input to the digital conversion/storage portion 403 and converted into a digital signal. Then, the adaptive filter 404 inputs the digital signal and outputs a response wave mf(i). (An example of the response wave mf(i) is shown in FIG. 5C as the response wave 402). The value extraction device 405 inputs the response wave mf(i) and determines the amplitude Si and the delay time τi of the data portion RDD(i) of the reception wave 401 and determines straight delay wave. Then, the distortion correcting portion 406 corrects the delay distortion of received data RDD(i) based on the output of the adaptive filter 404 and the value extraction device 405.

As noted above, when the reception wave 302 (FIG. 4C) containing the starting signal is received, power is supplied to the microcomputer 113 of the signal processing circuit 140. Subsequently, the reception wave 401 containing the data portion RDD(t) and the pseudo-noise sign PN and delay wave portion RD(t) is output from the microphone 100 and separated from the reception wave 302 via the low pass filter 112. Then, the wave 401 is input to digital conversion/ storage portion 403. After the starting signal has been received, the microcomputer 113 knows that the reception wave portion should completely arrive after a time period equaling the sum of the duration dt of the data DATA and the duration pt of pseudo-noise sign PN elapses. The conversion/storage portion 403 digitally converts reception wave 403 and stores it in the RAM. Due to the delay waves resulting from indoor reflections, the starting point of the portion RD(i) contained in the wave 401 and stored in the RAM is uncertain.

The adaptive filter 404 inputs the digital signal output from digital conversion/storage portion 403 and functions as a programmable adaptive filter corresponding to the pseudo-noise sign PN contained in the data signal 400 which is transmitted by the transmitter. Based on the input digital signal, the filter 404 outputs the response wave mf(i). For example, when the adaptive filter 404 inputs the pseudo-noise sign PN and delay wave portion RD(i) of the reception wave PN, the filter 404 calculates the response wave mf(i) in accordance with the following equation:

$$mf(i) = \frac{\sum_{j=0}^{n} RD(i-j) \times PN(n-j)}{\sum_{j=0}^{n} [PN(j)]^2} \qquad (6)$$

In equation (6), n represents the length of pseudo-noise sign PN(i), and if n−j<0, PN(n−j)=0.

If the pseudo noise sign PN(j) is represented by a binary number, it can be expressed as 1 or −1. Accordingly, the denominator of equation (6) corresponds to the summation or subtraction of the data RD(i), and the numerator is an integer. Therefore, the processing time of the filter 404 does not need to be extremely fast, and thus, the filter 404 can be implemented via low-cost microcomputer. The response wave mf(i) calculated in equation (6) is output by the adaptive filter 404 and is the same as the response wave 402 shown in FIG. 5C.

The response wave 402 illustrated in FIG. 5C comprises a straight wave having a peak amplitude S0 and a delay wave having a peak amplitude S1. Furthermore, the peak amplitude S0 appears at a time t0 when the phase of the pseudo-noise sign PN(j) coincides with the phase of the portion RD(i−j) of the reception wave 401 at i=t0. The portion of the response wave 402 prior to τ0 has level which is so low that it does not have a pseudo-noise sign PN(j) and determined to be noise. Such portion is determined to be noise because the bit length of the data DATA is determined to be sufficiently shorter than the chip length of pseudo-noise sign PN.

By retracing the length dt of the data DATA and the length pt of the pseudo-noise sign PN of the transmission data signal 400 from the arrival time t0 of the amplitude S0 of the straight wave, the starting point of the signal 400 can be determined. In such case, the waveform time length dt of the data DATA is predetermined. In the present embodiment, a modulation system is employed in which the speaker 100 is directly driven with the signal 400 in which the data DATA is loaded prior to the pseudo-noise sign PN. Also, a demodulation system is employed in which the result of the modulation is stored in the digital conversion/storage portion 403 in the sensor and then passes through the corresponding adaptive filter 404. Such procedure enables the data portion RDD(t) of the reception wave 401 to be precisely extracted.

As shown in the response wave 402 of FIG. 5 (i.e. the output of adaptive filter 404), the negative peak of amplitude S1 of the delay wave appears at an arrival time t1. Accordingly, the arrival time t1 indicates the arrival and presence of the first delay wave. In other words, the peak amplitude S0 of the straight wave appears as an initial peak, and the peak amplitude S1 of the phase-inverted delay wave arrives a period t1–t0 after the arrival of the initial peak and constitutes a second peak.

Since one or more delay waves are superimposed upon the transmitted data signal 400, the reception wave 401 which is received by the sensor is distorted in comparison to the original data signal 400. Accordingly, one may assume that the data portion RDD(t) of the reception wave 401 is distorted by the delay wave in the same manner in which the pseudo-noise sign PN and delay wave portion RD(t) is distorted by the delay wave. Accordingly, the waveform of the data portion DATA of transmission wave 400 can be reproduced from data portion RDD(t) of the reception wave 401 based on the delay characteristic values of the response wave 402 output from the adaptive filter 404. In other words, the data portion DATA can be reproduced based on the amplitudes S0 and S1 and the times t0 and t1.

In order to obtain the delay characteristic values, the response wave 402 is supplied to the value extraction device 405, and the device 405 calculates the values from the response wave 402. Then, the data portion RDD(t) of the reception wave 401 and the delay characteristic values are output to the delay distortion correcting portion 406.

The delay distortion correcting portion 406 corrects the delay distortion of data portion RDD(i) by using the data portion RDD(i) obtained from the response wave 402 generated by the adaptive filter 404 in accordance with equation (6). Furthermore, the delay distortion is corrected based on the amplitude Si and delay time τi of the straight delay wave. The manner in which the portion 406 corrects the delay distortion is based on equation (2) explained in the "Principles of the Invention" and will be described with reference to the flow chart shown in FIG. 7.

The delay distortion correction program which is executed by the correcting portion 406 is stored in the ROM of the microcomputer 113. As shown in step 407 of FIG. 7, the microcomputer 113 receives the data portion RDD(i) output from adaptive filter 404. Furthermore, the term "n" represents the entire number of samples of the data portion RDD(i), and the term "i" relates to the instant in time at which the A/D converter of the conversion/storage portion 403 samples the portion RDD(i) and corresponds to a delay wave of the data portion RDD(i). After the microcomputer 113 receives all of the samples i of reception data RDD(i), the microcomputer 113 detects whether or not the delay time τ1 of the first delay wave is greater than the sampling point i (step 408). In other words, the microcomputer 113 detects in step 408 whether or not the straight wave, which arrives prior to the arrival of the delay wave, is input as the reception data wave SDD(i) in which the delay distortion has been corrected.

If the delay time τ1 of the first delay wave is greater than the sampling point i, the microcomputer 113 inputs reception data RDD(i) (i.e. the straight wave) as the corrected reception data wave SDD(i) (step 410). On the other hand, if the delay time τ1 of the first delay wave is not greater than the sampling point i, the microcomputer 113 calculates the corrected reception data wave SDD(i) (step 409). Specifically, the reception data wave SDD(i) is calculated in accordance with the following equation:

$$SDD(i) = RDD(i) - \sum_{j=1}^{m} Sj \cdot SDD(i - \tau j) \qquad (7)$$

where the term SDD(i–τj) equals 0 if i–τj<0;

m is the total number of delay waves contained in reception data wave RDD(i);

τj is the delay time the jth delay wave; and

Sj is the amplitude of the jth delay wave.

According to the operation of equation (7), the delay wave which arrives after the time τi (i.e. the delay wave which arrives after the first delay wave) is subtracted from the data portion RDD(i) in order to extract the corrected reception data wave SDD(i). The data wave SDD(i), in which the delay wave is removed from the data portion RDD(i), corresponds to the data DATA of the transmission signal 400. Thus, the data DATA can be reproduced according to the above method to thereby enable the original data DATA "1010101" to be demodulated.

After completing step 409 or 410, the microcomputer 113 determines if the sampling point i of the delay wave equals the number of samples n of the data portion RDD(i) (step 411). If the sampling point i does not equal the number of samples n, the sampling point is incremented by a predetermined value "a" (step 412), and the routine returns to step 408. However, if the sampling point i equals the number of samples n, the routine ends.

Figure 7:
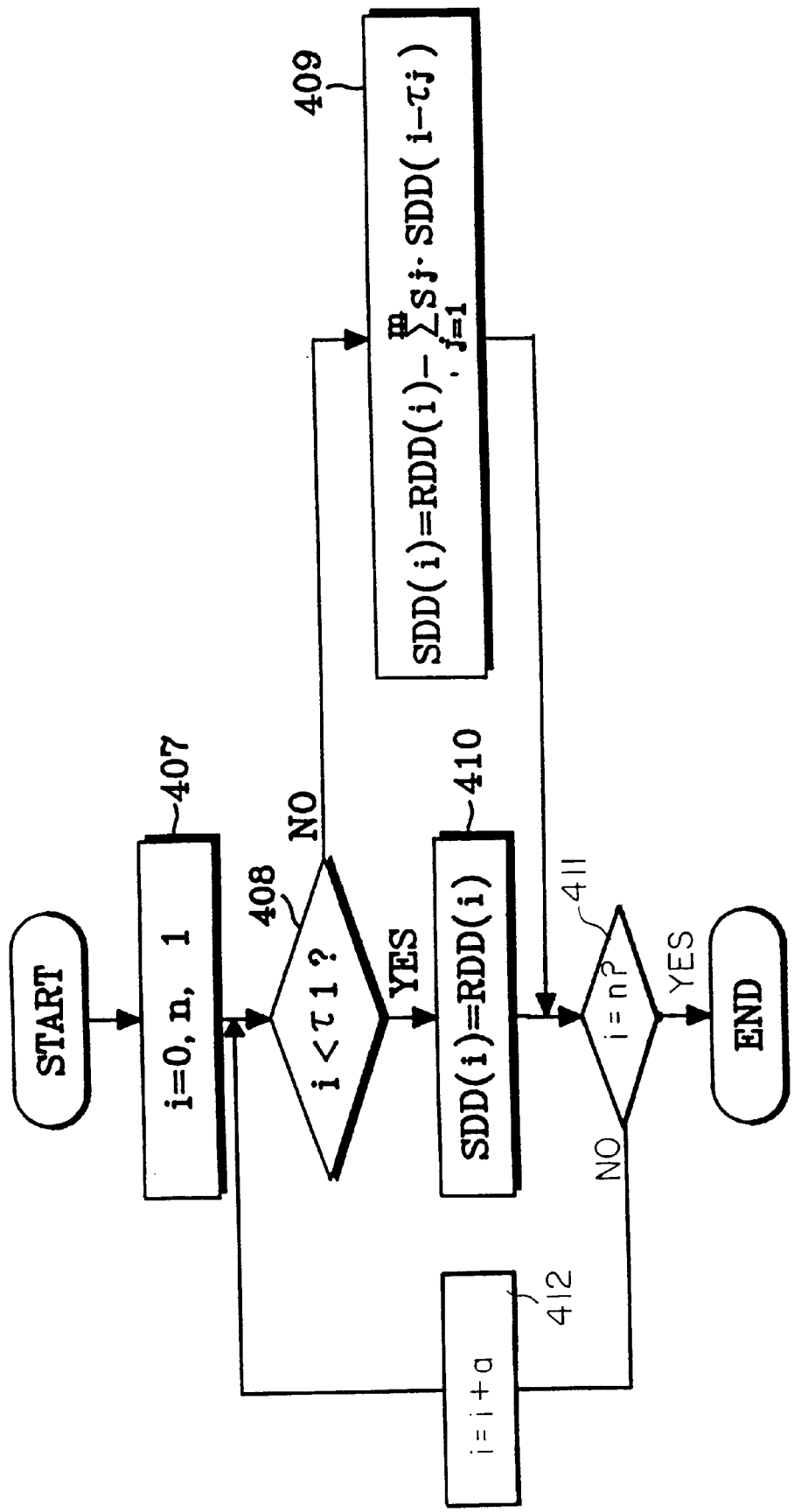
FIG. 7 is a flow chart of a distortion correction control process of the delay distortion corrector 406 shown in FIG. 6.

In the delay distortion correcting procedure shown in FIG. 7, the delay correction calculation is performed in step 409 based on the data portion RDD(i) corresponding to the period t=0–τ1 prior to the arrival of the first delay wave. Furthermore, the error of the data portion RDD(t) of the reception wave 401 and the error of the amplitude Si and delay time τj obtained from the adaptive filter 404 are accumulated in the right side term of equation (7). As the delay wave i increases, the errors contained in the corrected reception data wave SDD(i) increase. As a result, the data wave SDD(i) cannot be restored to the original form of the data DATA because it deviates from the original transmission waveform. Accordingly, when the bit length of the data DATA is transmitted once, the ability to restore the data DATA is limited.

A method for preventing errors from being accumulated in the corrected reception data wave SDD(i) will be described below. Furthermore, the method simultaneously compensates for the transmission characteristics of the electric fields generated by the speaker 100, the microphone 100, the speaker driver 114, and the preamplifier 111, including the entire spatial characteristics.

Figure 8:
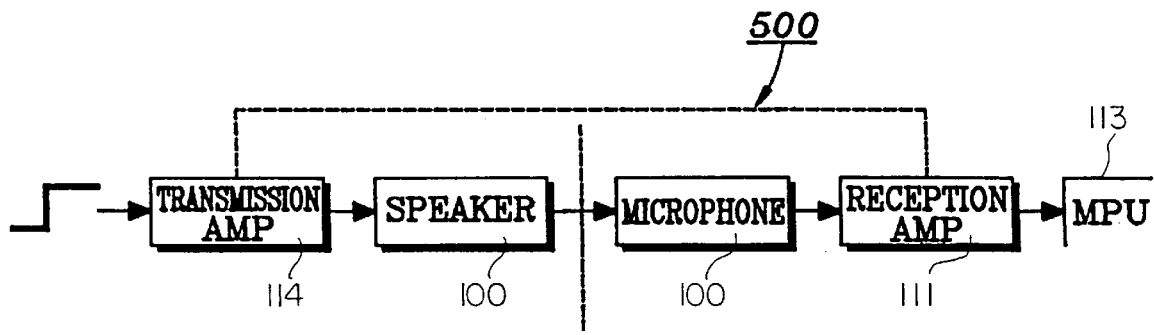
FIG. 8 is a block diagram of a transmission function model for explaining the step response of an electric field transmitted and received in the communication apparatus shown in FIG. 1.

FIG. 8 illustrates a transmission function model 500 of the electric field. In the model 500, the speaker driver (i.e. transmission amplifier) 114, the speaker 100, the microphone 100, and the preamplifier (i.e. reception amplifier) 111 are connected in series. When a step function is input to the transmission amplifier 114, a waveform signal corresponding to a step response s(t) is supplied to the microcomputer 113. In the present embodiment, the step response s(t) of the electric field is previously calculated and stored in the RAM of microcomputer 113.

Figure 9:
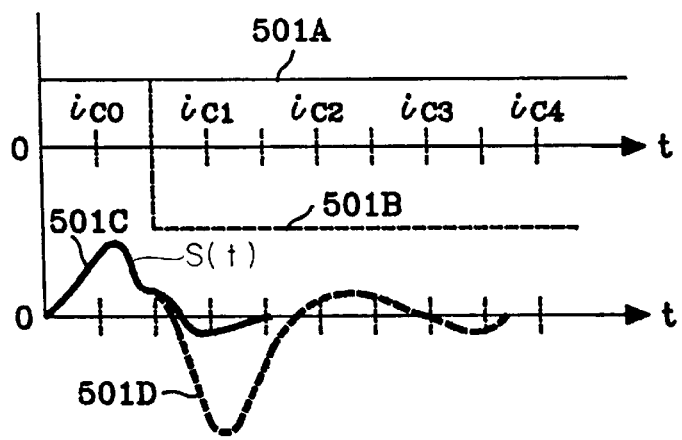
FIG. 9 is a waveform diagram of a step response wave of the electric field of FIG. 8.

FIG. 9 shows timing diagrams of the step function input to the transmission function model 500 and the step response s(t) output from the model 500. Specifically, the step function input to the model 500 is shown in the upper portion of the figure, and the step response s(t) output from the model 500 is shown in the lower portion of the figure. Moreover, the vertical axis of the diagrams represents amplitude, and the horizontal axis corresponds to time.

In the waveform diagram of input step function, the reference designators ic0 to ic4 correspond to the sample points of the bit center of the input step function. Furthermore, the reference numeral 501A represents the step function input to model 500, and the reference numeral 501B indicates the input step function when its phase is inverted before two bits. In the waveform diagram of the step response s(t), the reference numeral 501C is the waveform of step response s(t) with respect to input step function 501A, and the reference numeral 501D indicates the waveform of step response s(t) with respect to input step function 501B. Moreover, the waveform 501D is obtained by changing the polarity and phase with reference to the waveform 501C of the step response s(t).

If one assumes that the low-band cutoff frequency of the dynamic speaker 100 is 600 Hz, that the cutoff frequency of the preamplifier 111 and the low pass filter 112 is 2.5 KHz, and that the bit width is 400 s, the low frequency component of the waveform of the step response s(t) is interrupted as shown in FIG. 9. Specifically, the waveform 501C of the step response s(t) undulates after its peak because it is affected by the low pass filter 112. In this example, only the first bit of the step response s(t) is demodulated from the sample value of its respective bit center due to the lack of output of the low frequency domain of the speaker 100. However, as shown by the dotted line, the waveform 501D of the step response s(t) also has a substantial negative peak if the waveform 501A of the input step function is inverted at the second bit to produce the waveform 501B. In other words, even though the waveform whose low band is truncated cannot be appropriately demodulated in the transmission system when the values of the bits are determined only with respect to their center value, the waveform can be appropriately demodulated when the amount by which the waveform varies from the preceding bit center value is compared with the amount by which the waveform varies from the previously stored waveform 501A of step response s(t) of the electric field.

When the delay distortion is corrected based on equation (2), errors in the waveform are compounded when the delay component of the waveform is sequentially calculated and removed from the reception data portion RDD(i) in accordance with the waveform of the data portion RDD(i) which is initially input to the microprocessor 113. In the present embodiment, the first bit of the initially arriving waveform of the data portion RDD(i) is determined to be "1" or "0". In other words, the value of the first bit of the data portion RDD(i) is determined when $0<j<\tau 1$.

In accordance with the determination above, the transmission waveform BW(i) is obtained based on the previously stored waveform of the step response s(i) of the electric field. The amplitude S0 of the straight wave of the pseudo-noise sign PN and delay wave portion RD(i) is obtained from the response of the adaptive filter 404 so that corrected reception data wave SDD(i)=S0BW(i). If the delay wave having a peak amplitude S1 and a time delay $\tau 1$ is superposed on the second bit, the delay wave is removed from reception data RDD(i), and a transmission waveform is obtained based on the equation: SDD(i)=RDD(i)−S1BW(i−$\tau 1$). Then, the microcomputer 113 determines whether or not the phase of the second bit has changed with respect to the first bit based on the variation of the center values of the first and second bits of the obtained transmission waveform. As a result of the procedure above, the bit value is determined. The demodulation routine is performed by sequentially and repeatedly performing the procedure above. A more detailed example of the procedure for controlling the delay distortion correction described above is shown in FIG. 10.

Figure 10:
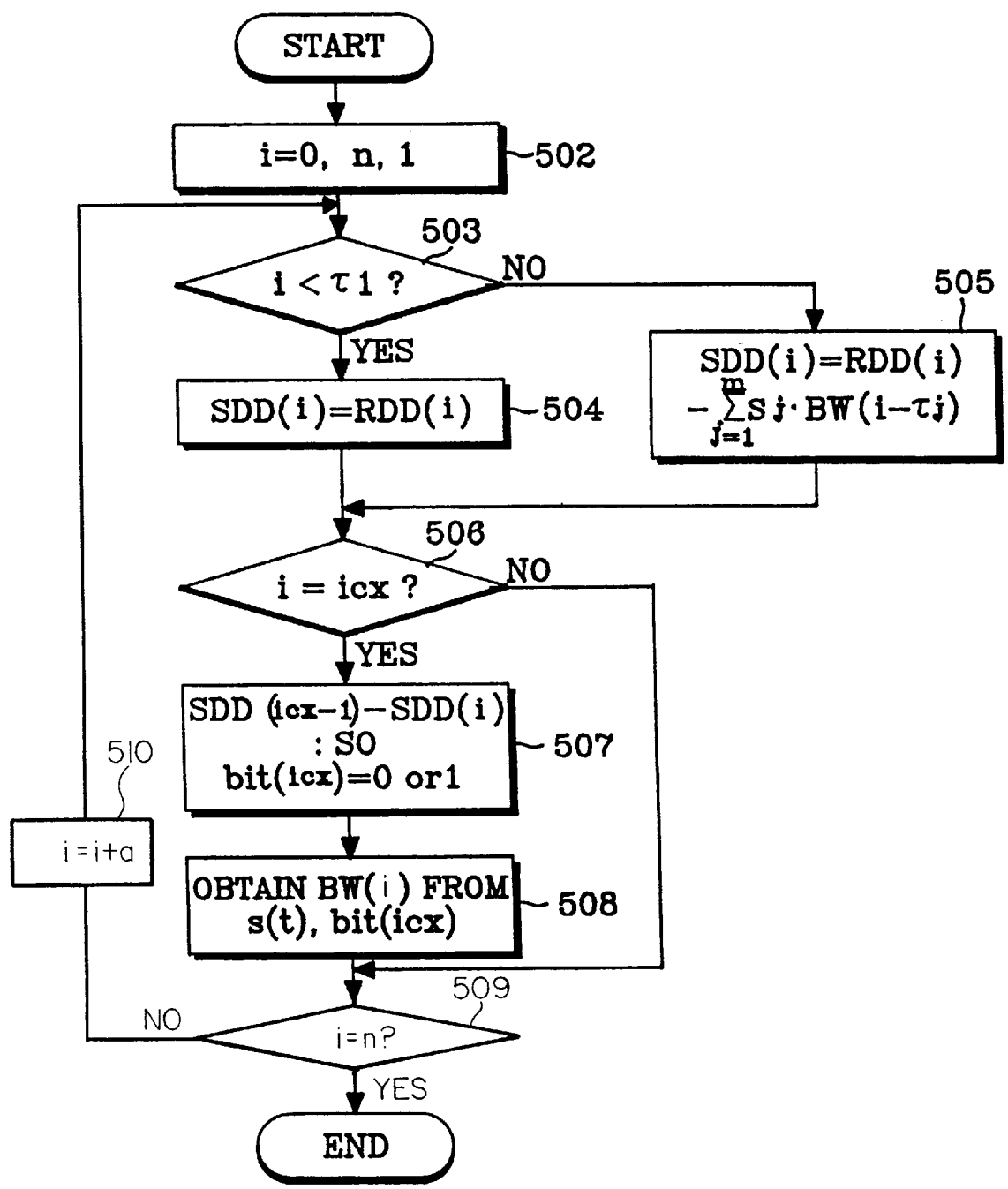
FIG. 10 is a flow chart of an accumulated error prevention process which is based on the step response shown in FIGS. 8 and 9.

In FIG. 10, the steps 502, 503, and 504 respectively correspond to steps 407, 408, and 410 shown in FIG. 7. Specifically, as shown in step 502 of FIG. 10, the microcomputer 113 receives the data portion RDD(i) output from adaptive filter 404. The term "n" represents the entire number of samples of the data portion RDD(i), and the term "i" relates to the instant in time at which the A/D converter of the conversion/storage portion 403 samples the portion RDD(i) and corresponds to a delay wave of the data portion RDD(i).

After the microcomputer 113 receives all of the samples i of reception data RDD(i), the microcomputer 113 detects whether or not the delay time $\tau 1$ of the first delay wave is greater than the sampling point i (step 503). In other words, the microcomputer 113 detects in step 503 whether or not the straight wave, which arrives prior to the arrival of the delay wave, is input as the reception data wave SDD(i) in which the delay distortion has been corrected.

If the delay time $\tau 1$ of the first delay wave is greater than the sampling point i, the microcomputer 113 inputs reception data RDD(i) (i.e. the straight wave) as the corrected reception data wave SDD(i) (step 504). On the other hand, if the delay time $\tau 1$ of the first delay wave is not greater than sampling point i, the microcomputer 113 calculates the corrected reception data wave SDD(i) (step 505). Specifically, the reception data wave SDD(i) is calculated in accordance with the following equation:

$$SDD(i) = RDD(i) - \sum_{j=1}^{m} Sj \cdot BW(i - \tau j) \qquad (8)$$

where

BW(i−$\tau$j) equals 0 if i−$\tau$j<0;

m is the total number of delay waves contained in the data portion RDD(i) of the reception wave 401;

$\tau$j is the delay time of the jth delay wave; and

Sj is the amplitude of the jth delay wave.

If equation (8) is solved such that the second term of the right side is removed, the delay wave is calculated.

The microcomputer 113 extracts the corrected reception data wave SDD(i) via step 504 and/or 505 and decides whether or not bit judgement should be performed (step 506). Specifically, the microcomputer 113 determines if the judgement logic icx (i.e. the center sample point of the xth bit) is the same as the sampling point of the delay wave. If the sampling point i is the same as the center sampling point of the xth bit, the microcomputer 113 determines if the phase between the bits of the reception wave varies when the delay wave is removed in order to determine if the xth bit is "0" or "1" (step 507). When determining if the phase between the bits varies, the amplitude S0 of the straight wave is used as the reference of the determination for convenience. Then, the microcomputer 113 calculates the value of the transmission waveform BW(i) based on the bit value bit(icx) determined in step 507 and from the step response s(t) (step 508).

After completing step 508 (or if the sampling point i is not the same as the center sampling point of the xth bit in step 506), the microcomputer 113 determines if the sampling point i of the delay equals the number of samples n of the data portion RDD(i) (step 509). If the sampling point i does not equal the number of samples n, the sampling point is incremented by a predetermined value "a" (step 510), and the routine returns to step 503. On the other hand, if the sampling point i equals the number of samples n, the routine ends.

Figure 11A:
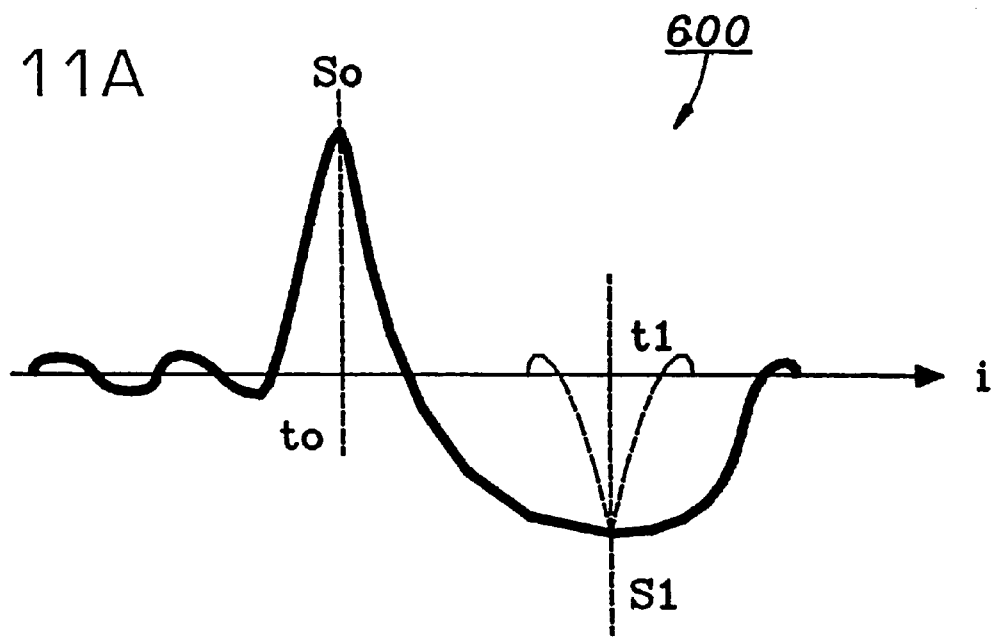
FIG. 11A shows the response waveform of the adaptive filter of FIG. 6
Figure 11B:
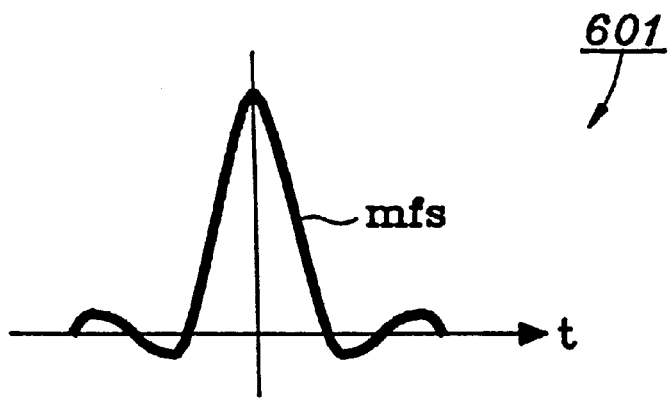
FIG. 11B shows the basic response wave mfs of the electric field of a pseudo-noise sign.

A method for reducing the effect of acoustic wave diffusion will be described with reference to FIGS. 11A, 11B, and 12. FIG. 11A shows a waveform of a response wave 600 output from the adaptive filter 404 when a multipath delay distorted pseudo-noise sign PN is input to the filter 404. (The response wave 600 is similar to the response wave 402 illustrated in FIG. 5C). In FIG. 11A, the vertical axis represents amplitude, and the horizontal axis represents time. In the step response wave 600 of the adaptive filter 404, the first steep peak is the amplitude S0 of the straight wave, and the second phase-inverted gentle peak is amplitude S1 of the delay wave.

The acoustic wave transmitted from the speaker 100 of the acoustic wave communication apparatus of the present embodiment is diffused spatially. Furthermore, the delay waves are reflected and diffracted by randomly shaped indoor objects and are diffused temporally so that they have a gentle peak when they arrive at the microphone 100 (see the gentle peak of the amplitude S1 in FIG. 11A). However, using the gradual second peak to determine the determine the arrival time t1 and the peak amplitude S1 of the delay wave is not satisfactory. In particular, the peak should be a steep peak (as indicated by the dotted line in FIG. 11A) so that the difference between the arrival time t1 and the arrival time t0 (among other values) can be accurately determined.

In the present embodiment the gentle peak shown in FIG. 11A is eliminated by mixing at least two peaks, and the delay distortion is corrected by using multiple delay waves. For instance, two delay waves respectively having amplitudes S10 and S11 and arrival times t10 and t11 may be used. A method for estimating an optimal value for determining the separation number, the amplitude, and the arrival time of the peak of the delay wave is described below.

As part of the method, an initial response wave of the adaptive filter 404 is obtained after the pseudo-noise sign PN passes the through the transmission function model 500 of the electric field shown in FIG. 8. Then, a basic peak waveform is taken with the response wave because, in such case, the basic peak waveform is considered to be the waveform in which no temporal diffusion exists. Actually, the basic peak waveform selected in the manner above is almost the same as the waveform of the straight wave. The delay characteristic value which approximates the actual waveform of the gentle peak is generated using multiple basic peak waveforms, and then, such value is analyzed. Subsequently, delay distortion correction is performed according to the methods described above.

The difference between the corrected reception data wave SDD(i) and the transmission waveform BW(i), which passed through the electric field and is obtained from the demodulated bit data, is defined as a correction error. The correction error confirms the validity of the resolution expression, and if the correction error is above a predetermined value, the delay characteristic value of the analyzed delay wave is precisely corrected. Then, the delay distortion is re-corrected. The above procedure is repeated until the correction error becomes below the predetermined value. If the correction error does not become lower than the predetermined value, the microcomputer 113 determines that an error is contained in the reception data and the procedure ends. A method for reducing the error of the amplitude Sj and the delay time τj of the jth delay wave which is caused by the temporal diffusion of delay wave will be described below in conjunction with FIG. 12.

The pseudo-noise sign PN and delay wave portion RD(i) of the reception wave 401 is separated and output by the low pass filter 112 and supplied to the microcomputer 113. Then, the microcomputer 113 obtains the amplitude Sj of the delay wave, the delay time τj of the delay wave, and the response waveform mf(j) from the adaptive filter 404 (step 602). The amplitude Sj, delay time τj, and the response wave mf(j) correspond to the response wave of the electric field of the pseudo-noise sign PN generated by the adaptive filter 404 after it inputs the portion PD(t) of the reception wave 401. In other words, the microcomputer 113 obtains the basic response waveform mfs as shown in FIG. 11B.

Figure 12:
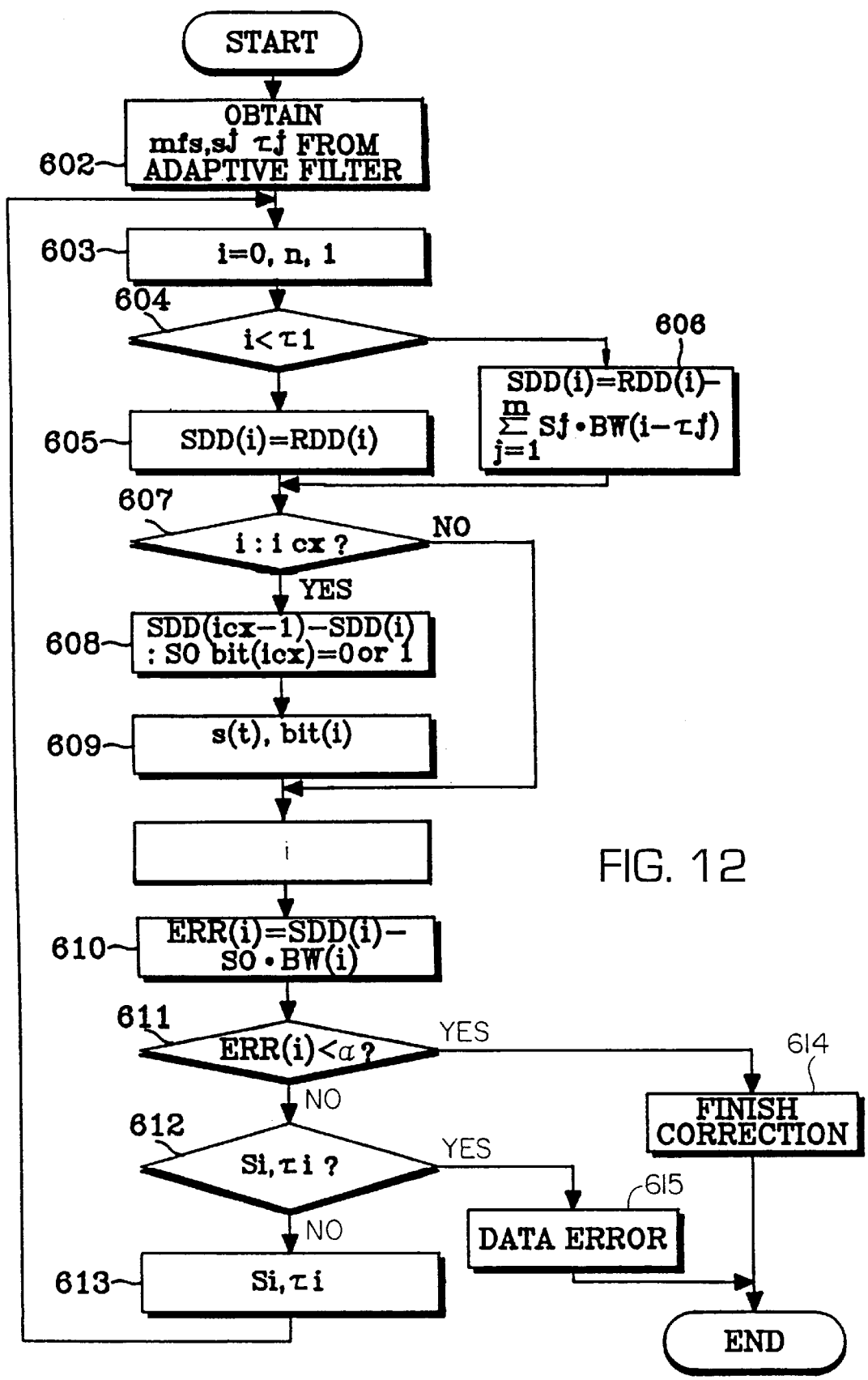
FIG. 12 is a flow chart of a delay distortion correction control procedure for reducing the effect of acoustic wave diffusion according to the present invention.

In FIG. 12, steps 603 to 609 are similar to steps 502 to 508 shown in FIG. 10 and will not be described for the sake of brevity. When the portion RD(i) of the reception wave 401 is input, the microcomputer 113 obtains the basic response wave mfs, the amplitude Sj of delay wave, and the delay time τj of delay wave from the response of adaptive filter 404. Then, the microcomputer 113 executes the delay distortion correction routine on the reception data to demodulate the data.

After executing the delay distortion correction routine, the microcomputer 113 determines the delay distortion correction error ERR(i) based on equation (4) (step 610). (Please note that the term "S0d0(i)" in equation (4) is equivalent to the corrected reception data wave SDD(i) in step 610). Afterwards, the microcomputer 113 compares the delay distortion correction error ERR(i) with a predetermined value a (step 611). If the delay distortion correction error ERR(i) is smaller than the value α, the microcomputer 113 finishes the correction routine (step 614).

If the delay distortion correction error ERR(i) is equal to or greater than value α, the microcomputer 113 determines whether or not the analysis and precise correction of the delay characteristic value are completed within a predetermined range (step 612). If the analysis and precise correction are completed, the microcomputer 113 determines that an error in the reception data exists (step 615), and the routine ends. If the analysis and precise correction of the delay characteristic value are not finished, the microcomputer 113 analyzes and precisely corrects the delay characteristic value based on the basic response waveform mfs obtained in step 602 (step 613). Then, the procedure returns to step 603.

By performing the procedures above, many problems can be solved such as: 1) the waveform distortion caused by the transmission characteristic of the electric field can be corrected based on equation (2); 2) the accumulation error resulting from calculating the corrected reception data wave SDD(i) can be corrected; and 3) the error caused by acoustic wave diffusion can be eliminated. The following description deals with a method for suppressing the effect of indoor noise on data transmitted via an acoustic wave in an indoor room.

FIGS. 13A to 13G show an example of suppressing noise which is superposed on the data portion in the reception wave. Accordingly, the figures illustrate a method for improving the S/N ratio of the data portion by suppressing noise. In FIGS. 13A to 13G, the vertical axis represents amplitude, and the horizontal axis represents time. Also, in order to simplify the explanation, the distortion caused by delay waves is excluded, and the signals are expressed as pulses. In the present embodiment, the same data is transmitted five times. Then, the five corresponding types of data are summed and averaged in the receiver of the acoustic wave communication apparatus according to equation (5) in order to suppress noise.

FIG. 13A illustrates a transmission wave 700 of data di(t) ("00011011") transmitted from the transmitter of the acoustic wave communication apparatus, and the wave 700 is repeatedly transmitted five times. FIGS. 13B to 13F respectively illustrate noise waves 701 to 705 having the same amplitude. Furthermore, the noise waves 701 to 705 are respectively superimposed on the five transmissions of the transmission wave 700 of data d(t). As a result, the first reception wave RD(t) is the sum of the transmission wave 700 and the noise wave 701, the second reception wave RD(t) is the sum of the transmission wave 700 and the noise wave 702, the third reception wave RD(t) is the sum of the transmission wave 700 and the noise wave 703, the fourth reception wave RD(t) is the sum of the transmission wave 700 and the noise wave 704, and the fifth reception wave RD(t) is the sum of the transmission wave 700 and the noise wave 705.

Figure 13G:
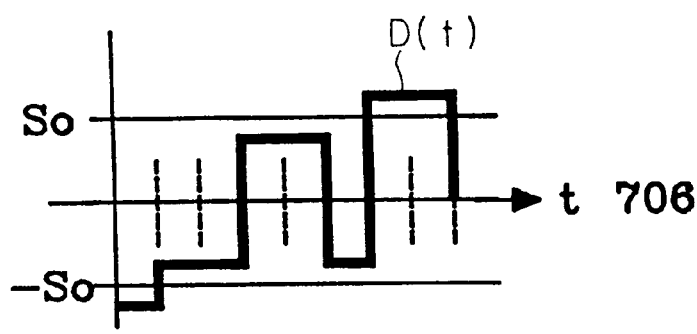
FIG. 13G shows a waveform of the average reception waveform which corresponds to the transmission wave and noise waveforms shown in FIGS. 13A to 13F.

The five reception waves RD(t) are summed and averaged by the receiver to produce the data wave 706 containing the data D(t) as shown in FIG. 13G. In FIG. 13G, the designator S0 corresponds to the amplitude of the straight wave obtained from the response of the adaptive filter 404. In the present example, the degree by which the amplitude S0 of the straight wave varies is 20%. Even though the S/N ratio=0 dB in each of the five reception waves RD(t), the S/N ratio is raised to 16 dB when each of the waves RD(t) are summed and averaged. Furthermore, the S/N ratio can be further improved by increasing the number of times that the transmission wave 700 is transmitted.

As described above, the acoustic wave communication apparatus of the present invention provides a highly reliable and low-cost indoor acoustic wave transceiver which is not affected by radio wave interference. Furthermore, the apparatus consumes a small amount of power in order to lengthen the life of the battery and can process signals quickly enough so that it can be practically implemented. Also, the apparatus effectively compensates for delay distortions in the reception wave and for the various transmission characteristic of the speaker. Consequently, the communication apparatus is especially useful for providing a reliable communication system for a household crime prevention system.

The embodiment of the acoustic wave communication apparatus described above transmits and receives an acoustic wave via a dynamic speaker/microphone. However, the speaker/microphone can be replaced with an individual speaker and ceramic resonant microphone or other similar devices.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A data modulation/demodulation method for an acoustic communication apparatus which receives an acoustic reception wave having reception data and a pseudo-noise sign, wherein said acoustic reception wave corresponds to an acoustic transmission wave having transmission data and a transmission pseudo noise sign, said method comprising the steps of:

(a) receiving said acoustic reception wave;

(b) converting said acoustic reception wave into a digital reception wave;

(c) storing said digital reception wave as a stored reception wave;

(d) dividing said stored reception wave into a data portion and a pseudo-noise sign portion based on said pseudo-noise sign;

(e) determining at least one multipath delay characteristic value of said acoustic reception wave based on said pseudo-noise sign portion;

(f) determining a transmission waveform based on said data portion, wherein said transmission waveform contains an initial data waveform which precedes an initial delay wave;

(g) sequentially calculating delay waves relating to said transmission waveform based on said at least one multipath delay characteristic value; and (h) respectively subtracting said delay waves from said transmission waveform in order to compensate for a delay distortion contained in said data portion to produce a delay distortion corrected waveform.

2. The method as claimed in claim 1, wherein said step (d) comprises the step of:

(d1) dividing said stored reception wave into said data portion and said pseudo-noise portion via an adaptive filter which performs a filtering operation based on said pseudo-noise sign.

3. The method as claimed in claim 1, wherein step (f) comprises the steps of:

(f1) estimating at least a first bit of said transmission data contained in said acoustic transmission wave based on at least said initial data waveform of said transmission waveform.

4. The method as claimed in claim 3, wherein step (f1) comprises the steps of:

(f1a) previously inputting a predetermined input function waveform to transmission components of said acoustic communication apparatus;

(f1b) detecting a corresponding response waveform output from reception components of said acoustic communication apparatus, wherein said reception components and said transmission components constitute a serial communication system; and (f1c) producing estimated transmission data by estimating at least said first bit of said transmission data based on said initial data waveform and said response, waveform.

5. The method as claimed in claim 4, wherein step (g) comprises the step of:

(g1) sequentially calculating said delay waves based on said response waveform and said at least one multipath delay characteristic value.

6. The method as claimed in claim 5, wherein said at least one multipath delay characteristic value comprises:

a straight wave amplitude of a straight wave, wherein said straight wave relates to said data portion;

an initial delay wave amplitude of said initial delay wave which follows said straight wave; and an initial delay time which corresponds to a time difference between said straight wave and said initial delay wave.

7. The method as claimed in claim 4, wherein said transmission components comprise a transmission amplifier and a speaker, and wherein said reception components comprise a microphone and a reception amplifier.

8. The method as claimed in claim 4, wherein said predetermined input function waveform comprises a step input function and said response waveform comprises a step response waveform which corresponds to said step input function.

9. The method as claimed in claim 4, further comprising the steps of:

(i) performing bit judgement for data bits of said delay distortion corrected waveform to determine values of said data bits;

(j) determining a data response waveform corresponding to a situation in which said estimated transmission data is input to said serial communication system;

(k) determining a correction error based on a difference between said data response waveform and said delay distortion corrected waveform; and (l) adjusting said at least one multipath delay characteristic value in order to reduce said correction error.

10. The method as claimed in claim 9, further comprising the step of:

(m) determining that an error has occurred when said correction error is not reduced below a predetermined value.

11. The method as claimed in claim 1, wherein said step (a) comprises thee step of:

(a1) receiving said acoustic reception wave and at least a second acoustic reception wave, wherein said at least a second acoustic wave is generated by repeatedly transmitting said acoustic transmission wave, wherein said step (b) comprises the step of:

(b1) converting said acoustic reception wave and said at least said second acoustic wave into said digital reception wave and at least a second digital reception wave, respectively, wherein said step (c) comprises the step of:

(c1) storing said digital reception wave and said at least said second digital reception wave as said stored reception wave and at least a second stored wave, respectively, wherein said step (d) comprises the steps of:

(d1) dividing said stored reception wave into said data portion and said pseudo-noise sign portion based on said pseudo-noise sign; and (d2) dividing said at least said second stored reception wave into at least a second data portion and at least a second pseudo-noise sign portion based on said pseudo-noise sign, and wherein said step (f) comprises the steps of:

(f1) averaging said data portion and said at least said second data portion to produce an average data portion in which a noise component is reduced; and (f2) determining said transmission waveform based on said average data portion.

12. The method as claimed in claim 5, wherein said step (a) comprises the step of:

(a1) receiving said acoustic reception wave and at least a second acoustic reception wave, wherein said at least a second acoustic wave is generated by repeatedly transmitting said acoustic transmission wave, wherein said step (b) comprises the step of:

(b1) converting said acoustic reception wave and said at least said second acoustic wave into said digital reception wave and at least a second digital reception wave, respectively, wherein said step (c) comprises the step of:

(c1) storing said digital reception wave and said at least said second digital reception wave as said stored reception wave and at least a second stored wave, respectively, wherein said step (d) comprises the steps of:

(d1) dividing said stored reception wave into said data portion and said pseudo-noise sign portion based on said pseudo-noise sign; and (d2) dividing said at least said second stored reception wave into at least a second data portion and at least a second pseudo-noise sign portion based on said pseudo-noise sign, and wherein said step (f) comprises the steps of:

(f2) averaging said data portion and said at least said second data portion to produce an average data portion in which a noise component is reduced; and (f3) determining said transmission waveform based on said average data portion.

13. A data modulation/demodulation method for an acoustic communication apparatus which receives an acoustic reception wave having reception data and a pseudo-noise sign, wherein said acoustic reception wave corresponds to an acoustic transmission wave having transmission data and a transmission pseudo noise sign, said method comprising the steps of:

(a) receiving said acoustic reception wave;

(b) converting said acoustic reception wave into a digital reception wave;

(c) storing said digital reception wave as a stored reception wave;

(d) dividing said stored reception wave into a data portion and a pseudo-noise sign portion based on said pseudo-noise sign;

(e) determining at least one multipath delay characteristic value of said acoustic reception wave based on said pseudo-noise sign portion, wherein said at least one multipath delay characteristic values comprises a first delay time relating to a time delay between an initial time at which said data portion arrives and a subsequent time at which an initial delay wave begins;

(f) evaluating a current sample of said data portion which arrives at a current sample time;

(g) determining if said current sample time is less than said first delay time;

(h) if said current sample time is less than said first delay time, designating said current sample of said data portion as a current portion of a delay corrected data portion;

(i) if said current sample time is not less than said first delay time, calculating a current delay wave corresponding to said current sample time and subtracting said current delay wave from said current sample of said data portion to produce said current portion of said delay corrected data portion;

(j) determining if said current sample of said data portion corresponds to a final sample of said data portion; and (k) if said current sample of said data portion does not correspond to said final sample, incrementing said current sample time by a predetermined value and repeating said steps (f) to (k).

14. The method as claimed in claim 13, wherein said step (h) comprises the step of:

(hi) if said current sample of said data portion corresponds to a first segment of said data portion, designating said first segment as a current segment and estimating a current estimation value of said current segment of said data portion.

15. The method as claimed in claim 14, wherein said step (h1) comprises the steps of:

(h1a) previously inputting a predetermined input function waveform to transmission components of said acoustic communication apparatus;

(h1b) detecting a corresponding response waveform output from reception components of said acoustic communication apparatus, wherein said reception components and said transmission components constitute a serial communication system; and (h1c) estimating said current estimation value of said current segment of said data portion based on said current sample of said data portion and said response waveform.

16. The method as claimed in claim 15, wherein said step (i) comprises the step of:

(i1) estimating said current estimation value of said current segment of said data portion based on a previous estimation value of a previous segment of said data portion and said response waveform.

17. The method as claimed in claim 15, wherein said step (j) comprises the steps of:

(j1) determining a data response waveform for said current sample, wherein said data response waveform corresponds to a situation in which said current portion of said delay corrected data portion is input to said serial communication system;

(j2) determining a correction error based on a difference between said data response waveform and said current portion of said delay corrected data portion;

(j3) adjusting said at least one multipath delay characteristic value in order to reduce said correction error; and (j4) determining if said current sample of said data portion corresponds to a final sample of said data portion.

18. The method as claimed in claim 17, wherein said step (j3) comprises the step of:

(j31) determining that an error has occurred when said correction error is not reduced below a predetermined value.

* * * * *

UNITED STATES PATENT AND TRADEMARK OFFICE
CERTIFICATE OF CORRECTION

PATENT NO. : 6,122,312
DATED : September 19, 2000
INVENTOR(S) : Shiro, Shirai

It is certified that error appears in the above-identified patent and that said Letters Patent is hereby corrected as shown below:

Title page,
Item [73], Assignee, should be: -- S1 Corporation, Seoul, Republic of Korea --

Signed and Sealed this

Twenty-ninth Day of June, 2004

JON W. DUDAS
*Acting Director of the United States Patent and Trademark Office*